(12) United States Patent
Tsukida et al.

(10) Patent No.: US 9,205,662 B2
(45) Date of Patent: Dec. 8, 2015

(54) LIQUID CONSUMING APPARATUS AND METHOD FOR CONTROLLING LIQUID CONSUMING APPARATUS

(71) Applicant: Seiko Epson Corporation, Tokyo (JP)

(72) Inventors: Masaki Tsukida, Matsumoto (JP); Yuichi Nishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/620,900

(22) Filed: Feb. 12, 2015

(65) Prior Publication Data

US 2015/0239255 A1    Aug. 27, 2015

(30) Foreign Application Priority Data

Feb. 25, 2014  (JP) ................................. 2014-034097

(51) Int. Cl.

| | | |
|---|---|---|
| B41J 29/393 | (2006.01) | |
| B41J 2/175 | (2006.01) | |
| G01J 1/42 | (2006.01) | |
| G01F 23/292 | (2006.01) | |

(52) U.S. Cl.

CPC ........... *B41J 2/17566* (2013.01); *G01F 23/292* (2013.01); *G01J 1/4204* (2013.01); *B41J 2002/17573* (2013.01)

(58) Field of Classification Search

USPC .................................... 347/5, 7, 9, 14–15, 19
See application file for complete search history.

(56) References Cited

U.S. PATENT DOCUMENTS

| | | | |
|---|---|---|---|
| 5,900,888 A | 5/1999 | Kurosawa | |
| 6,012,795 A | 1/2000 | Saito et al. | |
| 7,252,377 B2 * | 8/2007 | Nishioka | B41J 2/17513 347/7 |
| 2005/0018007 A1 * | 1/2005 | Ujita | B41J 2/17566 347/19 |
| 2013/0229456 A1 * | 9/2013 | Kondo | B41J 2/1752 347/19 |
| 2013/0233047 A1 | 9/2013 | Sato | |

FOREIGN PATENT DOCUMENTS

| | | |
|---|---|---|
| JP | 05-332812 A | 12/1993 |
| JP | 2002-130655 A | 5/2002 |
| JP | 2013-188879 A | 9/2013 |

* cited by examiner

*Primary Examiner* — Lam Nguyen

(57) ABSTRACT

A liquid consuming apparatus 200 includes a photosensor 80 capable of facing a prism 320 provided in a liquid container, and a control unit 100. The control unit 100 performs remaining status determination processing for determining remaining status of liquid in the liquid container, based on a detection signal detected by the photosensor 80 due to reflection from the prism 320 when light is emitted by the photosensor 80, performs ambient light determining processing for determining whether or not the remaining status determination processing is affected by ambient light, based on the detection signal detected by the photosensor 80 when light is not emitted by the photosensor 80, and continues printing until the end of printing on a sheet that is being printed, even if the control unit 100 determines that the influence of ambient light is present, by the ambient light determination processing during execution of printing.

10 Claims, 13 Drawing Sheets

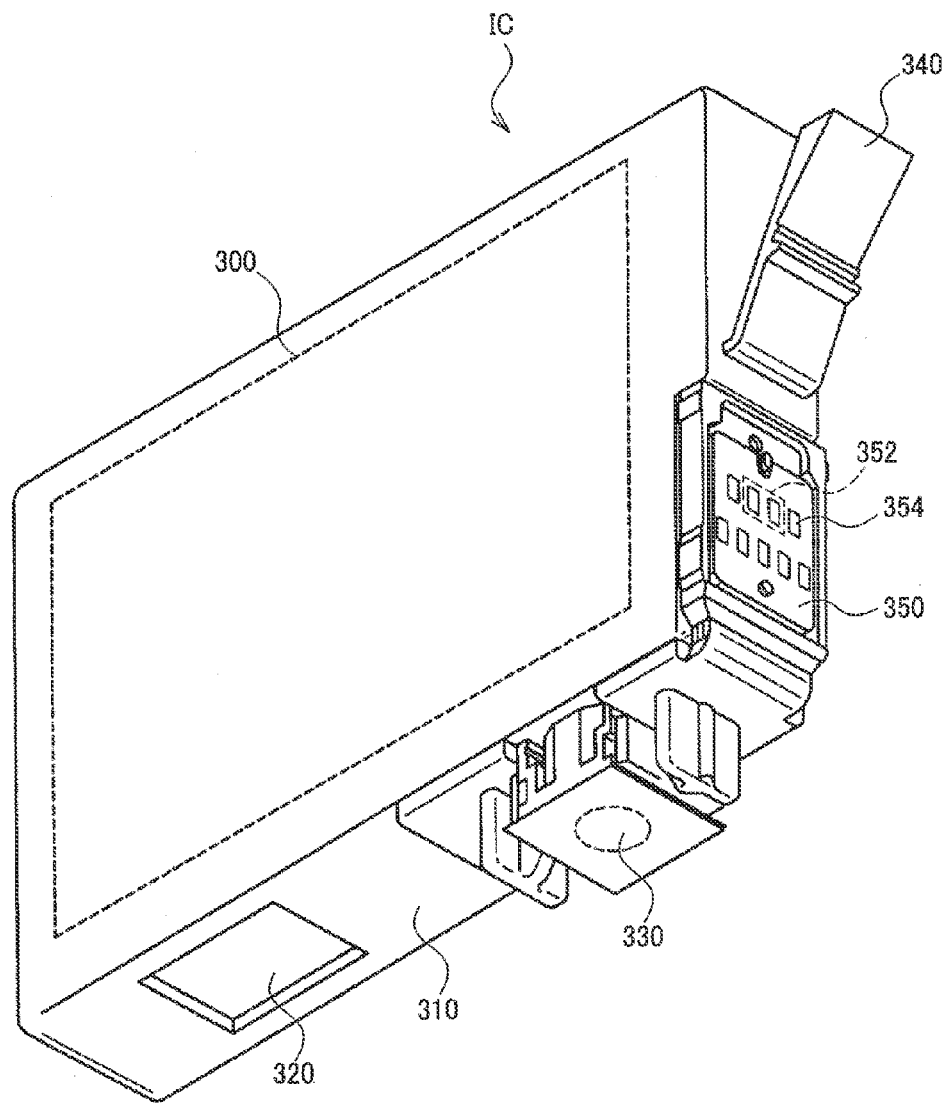
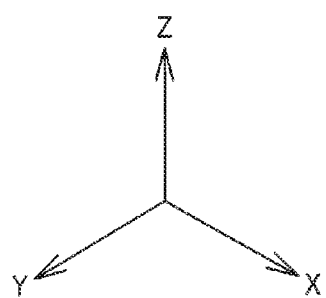
FIG. 2

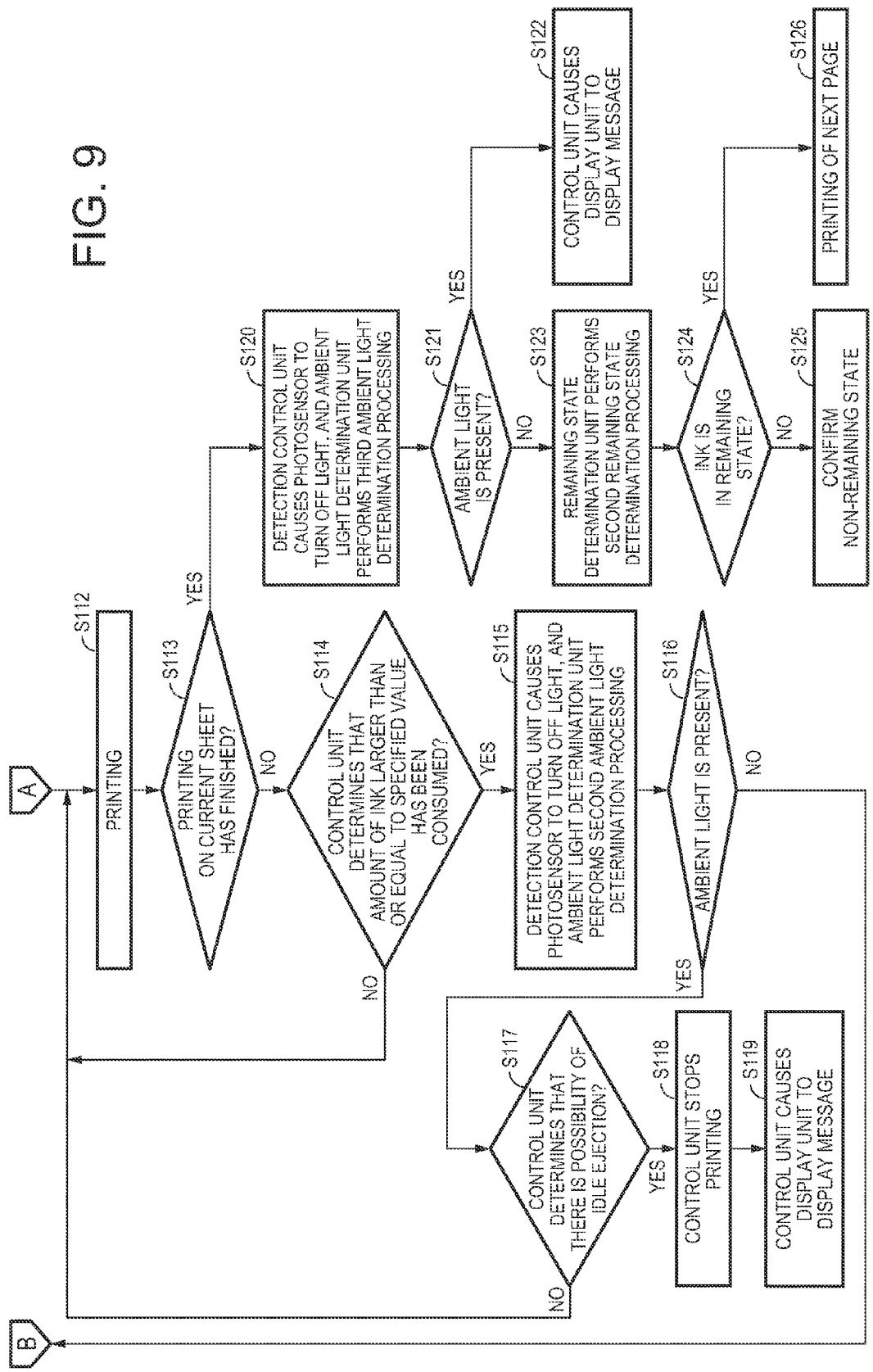

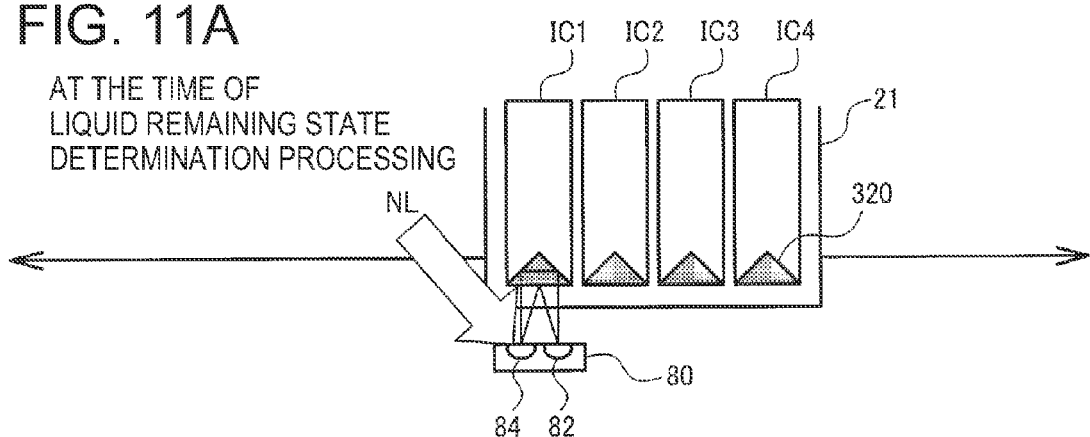
FIG. 11A
AT THE TIME OF
LIQUID REMAINING STATE
DETERMINATION PROCESSING
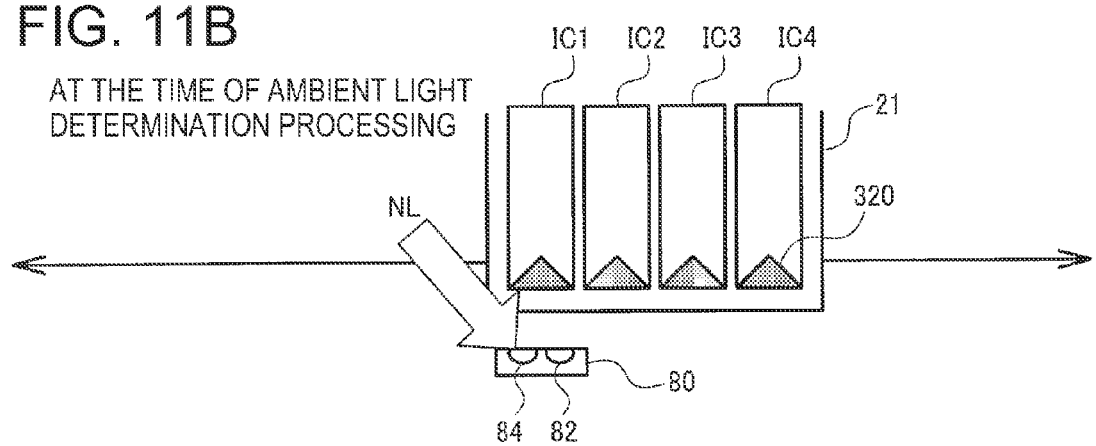
FIG. 11B
AT THE TIME OF AMBIENT LIGHT
DETERMINATION PROCESSING
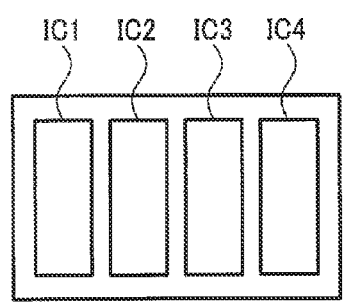
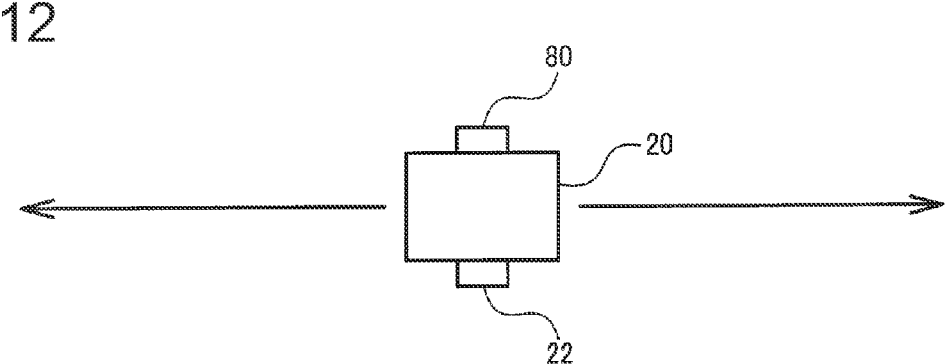
FIG. 12

LIQUID CONSUMING APPARATUS AND METHOD FOR CONTROLLING LIQUID CONSUMING APPARATUS

BACKGROUND

1. Technical Field

The present invention relates to a liquid consuming apparatus, a method for controlling a liquid consuming apparatus, and the like.

2. Related Art

In an inkjet printer serving as an exemplary liquid consuming apparatus, ink cartridges, which are detachable liquid containers, are installed. Some ink cartridges are provided with an optical path member (prism) for more correctly detecting that the amount of ink in the ink cartridges has fallen below a predetermined amount.

For example, in a known technique described in JP-A-5-332812, an optical path member having a refractive index close to the refractive index of ink is provided in each ink cartridge. If the inside of the optical path member is filled with ink, the light from a light-emitting portion is transmitted through the ink from the optical path member. On the other hand, if the inside of the optical path member is not filled with the ink and is empty, the light from the light-emitting portion is totally reflected at an inner face of the optical path member, and the totally reflected light is detected by a light-receiving portion. The remaining status of the ink can thereby be detected.

JP-A-2013-188879 discloses a technique by which, in an apparatus that determines the remaining status of ink or the like using a photosensor, processing for detecting a failure of the sensor is performed, and different processing for determining the remaining status is performed when a sensor failure is detected and when it is not detected.

When the remaining status of liquid such as ink is determined using light as in JP-A-5-332812 and JP-A-2013-188879, it is conceivable to use a photosensor having a light-emitting portion and a light-receiving portion. At this time, if not only the reflected light from the optical path member in the ink cartridge but also ambient light enter the light-receiving portion of the photosensor, the remaining status of ink is incorrectly determined in some cases. In such cases, the reliability of a result of the determination of the remaining status of liquid will be low.

In contrast, in JP-A-2013-188879, a sensor failure is detected at a position of a failure detection plate, based on the light received by the light-receiving portion while the light-emitting portion is caused to emit light. Specifically, failure determination is realized by simple processing, which is comparison between a signal value in this state and a given reference signal value. It is thereby possible to also detect the case where the photosensor is adversely affected by ambient light. If it is determined that the photosensor is adversely affected by ambient light, the remaining status is not determined based on a detection signal obtained from the photosensor, but is determined based on an estimated remaining amount of the liquid. For this reason, there are cases where, even if the liquid in a liquid container actually is in a remaining state, it is incorrectly determined that the liquid is in a non-remaining state, and an ink cartridge replacement message is displayed. Furthermore, printing is stopped at this time even in the middle of the printing, and accordingly the time taken to finish the printing will be longer.

SUMMARY

According to some aspects of the invention, it is possible to provide a liquid consuming apparatus, a method for controlling a liquid consuming apparatus, and the like with which the frequency at which printing is stopped in the middle of the printing can be suppressed.

An aspect of the invention relates to a liquid consuming apparatus including: a photosensor having a light-emitting portion and a light-receiving portion and capable of facing a prism provided in a liquid container; and a control unit that controls printing. The control unit performs remaining status determination processing for determining remaining status of liquid in the liquid container, based on a detection signal detected by the photosensor due to reflection from the prism when light is emitted by the photosensor, the control unit performs ambient light determination processing for determining whether or not the remaining status determination processing is affected by ambient light, based on the detection signal detected by the photosensor when light is not emitted by the photosensor, and the control unit continues printing until the end of printing on a sheet that is currently being printed, even if the control unit determines, during execution of the printing, that the influence of the ambient light is present, by the ambient light determination processing.

In an aspect of the invention, even if the control unit determines that the remaining status determination processing is affected by ambient light, by the ambient light determination processing during execution of the printing, the printing is continued until the end of the printing on the sheet that is currently being printed. It is thereby possible to suppress the frequency at which printing is stopped in the middle of the printing. Furthermore, it is possible to suppress stopping of printing in the middle of the printing on one sheet.

In an aspect of the invention, the control unit may perform the ambient light determination processing if the control unit determines that the liquid is in a non-remaining state, by the remaining status determination processing during execution of printing.

It is thereby possible to suppress the frequency at which the ambient light determination processing is performed, for example.

In an aspect of the invention, a carriage may further be included in which the photosensor or the liquid container is installed, the carriage moving back and forth during execution of printing. The control unit may change a relative positional relationship between the liquid container and the photosensor at the time of execution of printing, the control unit may cause, at the time of a given print path, the photosensor to emit light, and perform the remaining status determination processing, based on the detection signal obtained from the photosensor, and, at the time of a print path other than the given print path, the control unit may turn off the light of the photosensor and perform the ambient light determination processing, based on the detection signal obtained from the photosensor.

The light-receiving portion of the photosensor can thereby detect only ambient light without receiving the light radiated by the light-emitting portion, and determine whether or not the liquid remaining status determination processing is affected by ambient light, for example.

In an aspect of the invention, a liquid remaining amount estimation unit may further be included that estimates a remaining amount of liquid in the liquid container. If the liquid remaining amount estimation unit estimates that an amount of liquid larger than or equal to a given amount has been consumed, after the control unit determines, in the ambient light determination processing, that the remaining status determination processing is affected by the ambient light, the control unit may stop printing even in the middle of the printing on the sheet.

It is thereby possible to suppress occurrence of idle ink ejection, for example.

In an aspect of the invention, the control unit may continue printing even after determining by the ambient light determination processing that the remaining status determination processing is affected by the ambient light, the control unit may perform second ambient light determination processing for determining whether or not the remaining status determination processing is affected by the ambient light, every time a given specified amount of liquid is consumed, and the control unit may perform the remaining status determination processing if the control unit determines, in the second ambient light determination processing, that the remaining status determination processing is not affected by the ambient light.

It is thereby possible to determine, while printing is continued, whether or not the influence of ambient light on the remaining status determination processing has disappeared, for example.

In an aspect of the invention, the control unit may perform third ambient light determination processing for determining whether or not the remaining status determination processing is affected by the ambient light, when printing for one sheet finishes.

It is thereby possible to determine, at the time when printing for one sheet finishes, whether or not the state of the influence of ambient light on the remaining status determination processing has changed, for example.

In an aspect of the invention, if the control unit determines, in the third ambient light determination processing, that the remaining status determination processing is affected by the ambient light, the control unit may notify a user of the presence of the ambient light.

It is thereby possible to display, for example, a message indicating an instruction to replace the liquid container on the display unit at the time when printing for one sheet finishes, for example.

In an aspect of the invention, if the control unit determines, in the third ambient light determination processing, that the remaining status determination processing is not affected by the ambient light, the control unit may perform the second remaining status determination processing for the liquid in the liquid container, and if the control unit determines, in the second remaining status determination processing, that the liquid is in a remaining state, printing of the next sheet may be performed.

It is thereby possible to correctly re-determine that the liquid is in a remaining state and continue printing, when the adverse influence of ambient light is not present at the time when printing for one sheet finishes, for example.

In an aspect of the invention, if the control unit determines, in the third ambient light determination processing, that the remaining status determination processing is not affected by the ambient light, the control unit may perform the second remaining status determination processing for the liquid in the liquid container, and if the control unit determines that the liquid is in a non-remaining state, in the second remaining status determination processing, the control unit may confirm a determination result indicating the non-remaining state.

It is thereby possible to check that the liquid is in a non-remaining state when the adverse influence of ambient light is not present at the time when printing for one sheet finishes, for example.

Another aspect of the invention relates to a method for controlling a liquid consuming apparatus. The method includes: controlling printing; performing remaining status determination processing for determining remaining status of liquid in a liquid container, based on a detection signal detected by a photosensor, which has a light-emitting portion and a light-receiving portion and is capable of facing a prism provided in the liquid container, due to reflection from the prism when light is emitted by the photosensor; performing ambient light determination processing for determining whether or not the remaining status determination processing is affected by ambient light, based on the detection signal detected by the photosensor when light is not emitted by the photosensor, and continuing printing until the end of printing on a sheet that is currently being printed, even if the control unit determines, during execution of the printing, that the influence of the ambient light is present, by the ambient light determination processing.

BRIEF DESCRIPTION OF THE DRAWINGS

FIG. 2 is a perspective view showing a main part of an ink cartridge.

FIG. 9 is another flowchart illustrating a flow of processing in the present embodiment.

FIGS. 11A and 11B are diagrams illustrating control of a light-emitting portion of a photosensor.

FIG. 12 is a diagram illustrating a technique of moving a carriage in which a head and the photosensor are installed.

DESCRIPTION OF EXEMPLARY EMBODIMENTS

Figure 1:
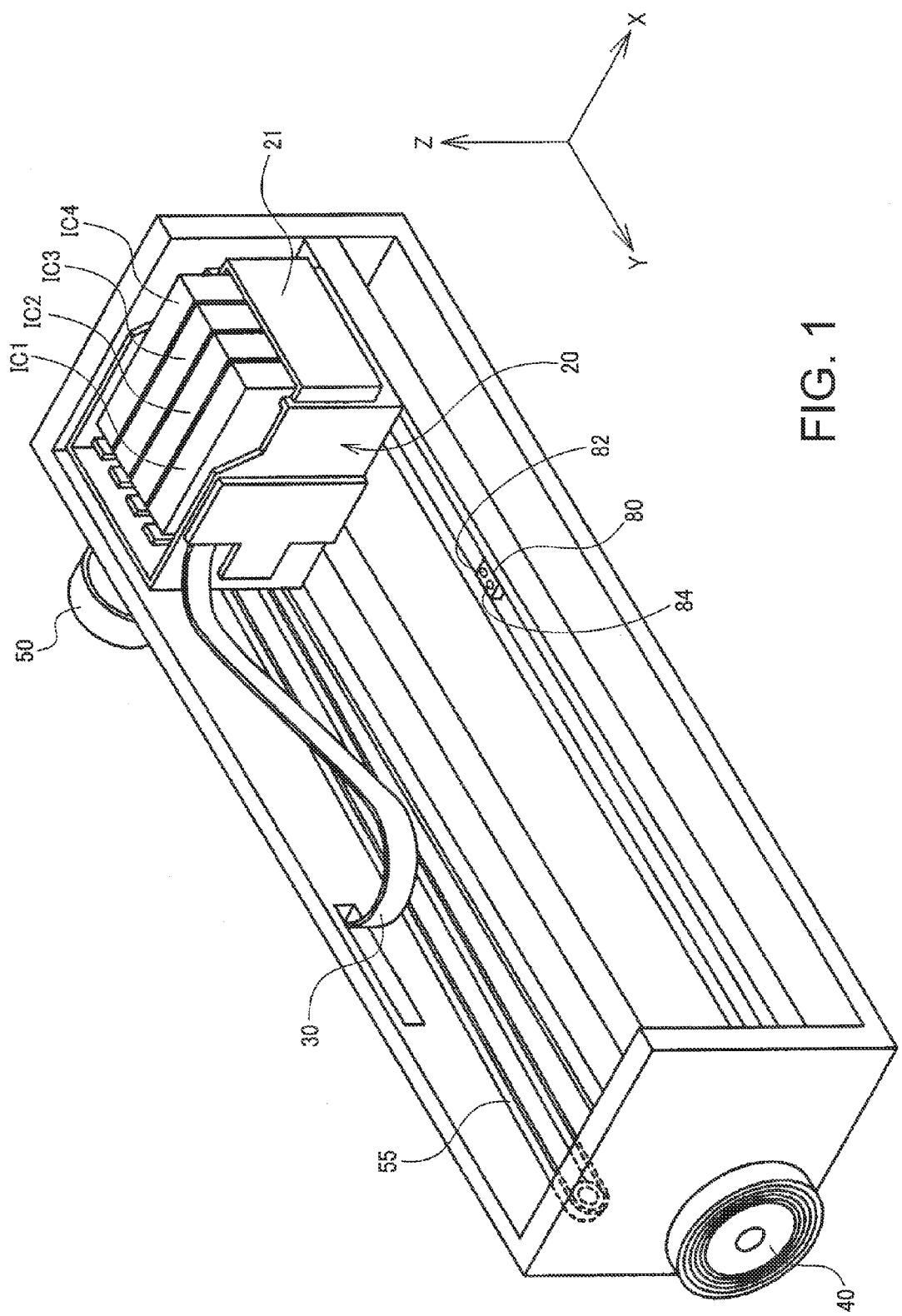
FIG. 1 is a perspective view showing a main part of a printer according to the present embodiment.

Hereinafter, the present embodiment will be described. Note that the present embodiment described below is not intended to unjustly limit the content of the invention stated in the scope of claims. Not all configurations described in the present embodiment necessarily are essential constituent elements of the invention.

For example, ink cartridges that contain ink and a printer that discharges the ink will be taken as examples in the following description. However, the present embodiment is not limited thereto, and is applicable to liquid containers that contain various kinds of liquid and a liquid consuming apparatus that discharges (ejects) this liquid. The liquid need only be able to be discharged by the liquid consuming apparatus, and includes, for example, solutions, solvents, sols, gels, and those in which various materials, particles, or the like are dissolved or mixed.

1. Technique in Present Embodiment

First, a technique in the present embodiment will be described. As disclosed in JP-A-5-332812 mentioned above, a technique of determining the remaining status of liquid (i.e., a technique of determining an ink near-end state) using a photosensor is known. With this technique, the photosensor needs to accurately detect light. If a failure or the like occurs in the photosensor, a result of the remaining status determination using this photosensor will be less accurate.

For example, if a light-receiving portion of the photosensor receives ambient light when the remaining status of the liquid is determined, even if the liquid in a liquid container is actually in a remaining state, it is incorrectly determined that the liquid is in a non-remaining state in some cases. Light such as ambient light originally is not desired to be detected in the remaining status determination, while it is favorable to detect such light similarly to a sensor failure in terms of the adverse influence on the remaining status determination. Note that "ambient light" mentioned here is, for example, light that enters the inside of the liquid consuming apparatus from the outside thereof, and specific examples of ambient light include light detected when the cover of the liquid consuming apparatus is open.

On the other hand, as disclosed in JP-A-2013-188879 mentioned above, various techniques of detecting a failure of the photosensor are also known. In JP-A-2013-188879, a failure detection plate constituted by a mirror that totally reflects light detects, at a position immediately above the photosensor, a failure using a detection signal of a light-receiving portion in a state where a light-emitting portion is caused to emit light. Specifically, a predetermined voltage value range is set in advance, and it is determined that the photosensor is normal if the voltage value is within this range, and it is determined that the photosensor has failed if the voltage value is out of the range.

In the invention in JP-A-2013-188879, the case where the photosensor is adversely affected by ambient light can also be detected as a failure of the photosensor. However, it cannot be separately determined whether a failure has occurred in the photosensor itself or the photosensor is adversely affected by ambient light.

If it is determined that the photosensor has failed or is affected by ambient light, the remaining status is not determined based on a detection signal obtained from the photosensor, but is determined based on an estimated remaining amount of liquid. For this reason, there are cases where, even if the liquid in a liquid container actually is in a remaining state, it is incorrectly determined that the liquid is in a non-remaining state, and an ink cartridge replacement message is displayed. Printing is stopped at this time even in the middle of printing, and accordingly the time taken to finish the printing will be longer.

In the first place, it is necessary to stop printing and notify a user to eliminate the influence of ambient light or display an ink cartridge replacement message when it is the case where the liquid in the ink cartridges is in a non-remaining state (a near-end state). That is to say, the remaining status needs to be determined using the photosensor when the state of the liquid in an ink cartridge transitions from a remaining state to a non-remaining state, and, it is not highly necessary to perform remaining status determination processing using the photosensor when it can be determined using, for example, the dot count that the liquid in the ink cartridge is in a remaining state. Accordingly, in this case, printing does not necessarily need to be stopped. There have been cases where, when the photosensor is thus adversely affected by ambient light, the liquid consuming apparatus incorrectly detects a non-remaining state, stops printing even though printing does not need to be stopped, and consequently it takes time to finish printing.

Accordingly, in the liquid consuming apparatus according to the present embodiment, even if a light-receiving portion of the photosensor receives ambient light and it is incorrectly determined based on a detection signal of the photosensor that the liquid in an ink cartridge is in a non-remaining state, printing is continued and is not immediately stopped when it can be determined, using other methods such as the dot count, that the liquid is in a remaining state (i.e., not in a near-end state).

Specifically, as shown in later-described FIG. 3, a liquid consuming apparatus 200 in the present embodiment includes a liquid remaining amount estimation unit 150 that estimates the remaining amount of liquid in liquid containers (corresponding to IC1 to IC4), a photosensor 80 having a light-emitting portion 82 and a light-receiving portion 84 and capable of facing a prism 320 provided in each liquid container, and a control unit 100 that performs remaining status determination processing for determining the remaining status of the liquid in each liquid container, based on a detection signal obtained from the photosensor 80, and controls printing. If the control unit 100 determines based on the detection signal that the liquid in each liquid container is in a non-remaining state but determines that the remaining amount of the liquid estimated by the liquid remaining amount estimation unit 150 is larger than or equal to a given remaining amount, the control unit 100 continues printing.

For example, assume that, as in an example shown in later-described FIG. 7B, the control unit 100 incorrectly determines that ink IK in an ink cartridge IC is in a non-remaining state, based on the detection signal obtained from the photosensor 80, which is receiving ambient light NL. Also assume that the control unit 100 determines that the remaining amount of the ink IK estimated by the liquid remaining amount estimation unit 150 using the dot count is larger than or equal to a given remaining amount. In this case, in the present embodiment, the control unit 100 does not stop printing and continues printing.

In this manner, printing can be continued when the liquid in each liquid container is in a remaining state and it can be determined that printing does not need to be stopped. Accordingly, the liquid consuming apparatus in the present embodiment can suppress the frequency at which printing is stopped in the middle of the printing. The time taken to finish the printing can thereby be shortened. Furthermore, since an instruction to replace a liquid container is not given as much as possible to the extent to which printing does not fail, the amount of liquid available in printing in the liquid container can be substantially increased, for example.

Also, if the control unit 100 determines based on the detection signal that the liquid is in a non-remaining state, and determines that the remaining amount of the liquid estimated by the liquid remaining amount estimation unit 150 is smaller than the given remaining amount, the control unit 100 performs ambient light determination processing for determining whether or not the remaining status determination processing is affected by ambient light.

For example, assume that, as in examples shown in later-described FIGS. 7C and 7D, the control unit 100 determines that the ink IK in the ink cartridge IC is in a non-remaining state, based on the detection signal obtained from the photosensor 80 that may possibly be receiving the ambient light NL. Furthermore, assume that the control unit 100 determines that the remaining amount of the ink IK estimated by the liquid remaining amount estimation unit 150 using the dot count is smaller than the given remaining amount. In this case, the control unit 100 performs the ambient light determination processing for determining whether or not the remaining status determination processing is affected by ambient light. This ambient light determination processing is performed in order to determine whether or not a result of the remaining status determination processing performed based on the detection signal from the photosensor 80 is reliable.

In the present embodiment, as mentioned above, the ambient light determination processing is performed when it is determined that the liquid is in a non-remaining state and it is also determined that the estimated remaining amount of liquid is smaller than the given remaining amount, and accordingly, the frequency at which the ambient light determination processing is performed can be suppressed. That is to say, unnecessary ambient light determination processing will not have to be performed when it can be concluded based on the dot count that the liquid is in a remaining state.

Figure 7A:
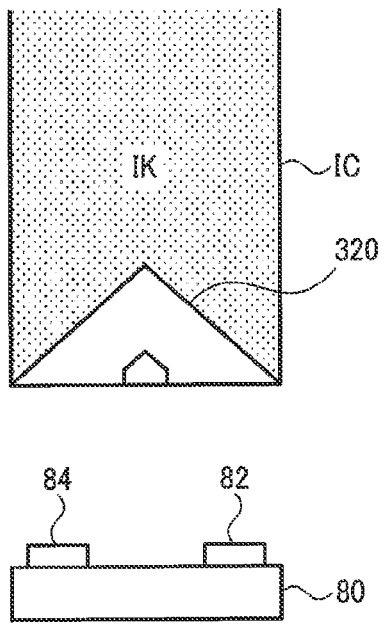
FIGS. 7A to 7D are diagrams illustrating relationships between the remaining status of ink and ambient light.
Figure 7B:
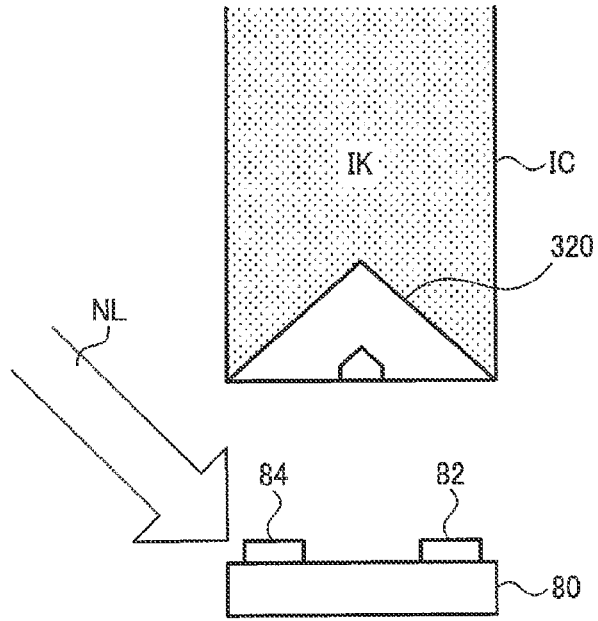
Figure 7C:
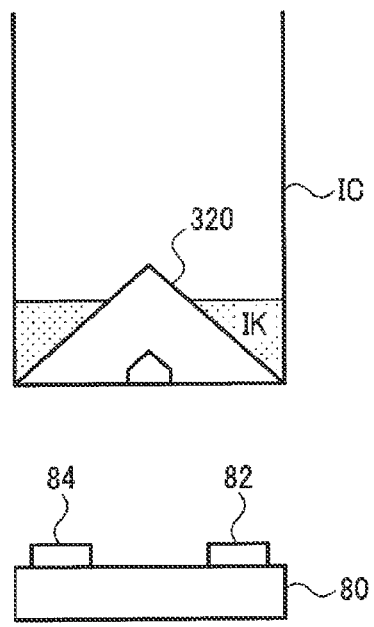

If it is determined, in the ambient light determination processing, that there is no influence of ambient light as in the example in FIG. 7C, it is determined that the remaining status determination processing performed based on the detection signal from the photosensor 80 is reliable. That is to say, when the control unit 100 determines, in the ambient light determination processing, that the remaining status determination processing is not affected by ambient light, the control unit 100 confirms that the liquid is in a non-remaining state.

An instruction to replace the liquid container can thereby be given to the user when it can be determined that the liquid remaining status determination processing using the photosensor is not adversely affected by ambient light and it is also determined that the liquid is in a non-remaining state.

Figure 7D:
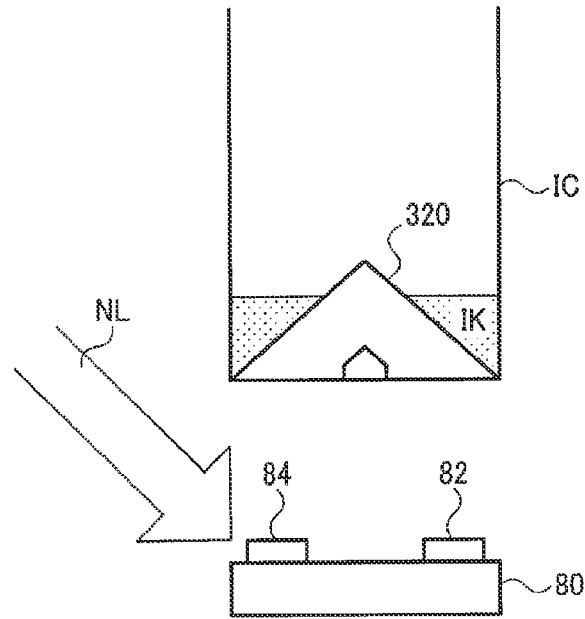

On the other hand, for example, if it is determined that the influence of ambient light is present as in the example in FIG. 7D, it is determined that the remaining status determination processing performed based on the detection signal from the photosensor 80 is not reliable, printing is stopped, and a user is notified that there is adverse influence of ambient light.

It is thereby possible to give the user an instruction to eliminate the influence of ambient light only when the liquid remaining status determination processing using the photosensor needs to be performed but the remaining status cannot be accurately determined due to the influence of ambient light, for example.

Furthermore, in actuality, the liquid consuming apparatus 200 has a plurality of liquid containers (IC1 to IC4) as shown in later-described FIG. 3, for example. The liquid remaining amount estimation unit 150 estimates the remaining amount of liquid in each of the plurality of liquid containers. Furthermore, the control unit 100 performs the remaining status determination processing, based on the detection signal for each liquid container obtained from the photosensor 80, and determines for each liquid container whether or not to continue printing, based on the remaining amount of the liquid estimated by the liquid remaining amount estimation unit 150 and a result of the remaining status determination processing.

It is thereby possible to determine the remaining status of the liquid in each of the plurality of liquid containers, and to give a replacement instruction for each liquid container.

Hereinafter, a liquid consuming apparatus in the present embodiment will be described in detail. A description will be given first of a basic configuration of the liquid consuming apparatus and an exemplary configuration of the ink cartridges, thereafter of an exemplary detailed configuration of the liquid consuming apparatus, and further of a technique of determining the remaining status of liquid (an ink near-end detection technique). Thereafter, the details of processing in the present embodiment will be described using flowcharts.

2. Basic Configuration of Printer, Ink Cartridges

FIG. 1 is a perspective view showing a main part of a printer (which is an exemplary liquid consuming apparatus) in the present embodiment. An X direction, a Y direction, and a Z direction that are orthogonal to one another are shown in FIG. 1. In a normal usage posture of the printer, a frontward direction of the printer is the X direction, and the vertical direction is the Z direction. For example, taking the X direction as an example, the direction of the arrow will be referred to as a +X direction (or simply an X direction), and the opposite direction will be referred to as a −X direction.

The printer in FIG. 1 includes ink cartridges IC1 to IC4 (liquid containers, liquid containing portions), a carriage 20 provided with a holder 21 in which the ink cartridges IC1 to IC4 are attachably and detachably accommodated, a cable 30, a paper feed motor 40, a carriage motor 50, a carriage drive belt 55, and a photosensor 80 (a detection portion). Note that the holder 21 and the carriage 20 may be formed as an integrated member, or may be formed as separate members and the holder 21 may be attached to the carriage 20.

The ink cartridges IC1 to IC4 each contain ink (liquid, printing agent) of a single color. The ink cartridges IC1 to IC4 are attachably and detachably installed in the holder 21. A head is provided in a face of the carriage 20 on the side in the −Z direction. The ink supplied from the ink cartridges IC1 to IC4 is discharged from the head toward a recording medium. The recording medium is printing paper, for example. The carriage 20 is connected to a control unit (the control unit 100 in later-described FIG. 3) by the cable 30, and discharging control is performed by the control unit via this cable 30. The paper feed motor 40 drives a paper feed roller 45 (shown in FIG. 3) to rotate, and sends printing paper in the X direction shown in FIG. 1. The carriage motor 50 drives a carriage drive belt 55 and moves the carriage 20 in the ±Y direction. A printing operation is performed by the control unit controlling the aforementioned discharging, paper feed, and movement of the carriage 20. Note that, hereinafter, the ±Y direction in which the carriage 20 is moved will be referred to as a "main scanning direction", and the X direction in which the printing paper is fed will be referred to as a "sub-scanning direction".

The photosensor 80 outputs a signal for detecting the remaining status of the ink in the ink cartridges IC1 to IC4. Specifically, the photosensor 80 includes a light-emitting portion 82 (a light-emitting device) that radiates light to a prism (a prism 320 in later-described FIG. 2) provided in each of the ink cartridges IC1 to IC4, and a light-receiving portion 84 (a light-receiving device) that receives reflected light from the prism and converts it into an electric signal. For example, the light-emitting portion 82 is constituted by an LED (Light-Emitting Diode), and the light-receiving portion 84 is constituted by a phototransistor.

Next, FIG. 2 will be described. FIG. 2 is a perspective view showing a main part of an ink cartridge IC. The ink cartridge IC shown in FIG. 2 corresponds to each of the ink cartridges IC1 to IC4 in FIG. 1.

The ink cartridge IC includes a rectangular parallelepiped (including substantially rectangular parallelepiped) ink containing portion 300 that contains the ink, a circuit board 350 (a board), a lever 340 for attaching and detaching the ink cartridge IC to/from the holder 21, an ink supply port 330 through which the ink is supplied to the head, and a prism 320 provided in a bottom face 310 of the ink cartridge IC. A storage device 352 that stores information regarding the ink cartridge IC is installed on the back face of the circuit board 350. A plurality of terminals 354 that are electrically connected to the storage device 352 are arranged in a front face of the circuit board 350. These terminals 354 are electrically connected to the control unit 100 on the side of the apparatus body via a plurality of apparatus body terminals provided in the holder 21, when the ink cartridge IC is installed in the holder 21. As the storage device 352, for example, a nonvolatile memory such as an EEPROM can be used.

The prism 320 is constituted by a transparent member with respect to the light from the light-emitting portion 82, and is made of polypropylene, for example. The prism 320 is provided such that an incident face thereof that the light from the light-emitting portion 82 enters is exposed from the bottom face 310 of the ink cartridge IC. The bottom face 310 is a face facing the side in the −Z direction when the ink cartridge IC is installed in the holder 21 in FIG. 1. The holder 21 has an opening for causing the light from the light-emitting portion 82 to enter the incident face of the prism 320. That is to say, upon the carriage 20 provided with the holder 21 moving in the main scanning direction (in the ±Y direction) in FIG. 1, the ink cartridges IC1 to IC4 sequentially pass above (in the +Z direction) the photosensor 80, and the reflected light from the prism 320 in each ink cartridge is received by the light-receiving portion 84. The photosensor 80 then outputs a result of light reception by the light-receiving portion 84 as a sensor output signal (a light reception result signal) corresponding to the position of the carriage 20. In the present embodiment, an ink near-end state of each ink cartridge is detected based on the sensor output signal corresponding to the position of the carriage 20.

Here, an "ink near-end state" refers to a state where the remaining amount or the liquid surface level of the ink contained in the ink containing portion 300 falls below a predetermined value, and a small amount of the ink is left in the ink cartridge IC. For example, it refers to a state where there is a possibility that the head will cease discharging the ink if printing is continued after an ink near-end state is detected by the photosensor, and then the amount of consumed ink estimated by the liquid remaining amount estimation unit 150 exceeds a predetermined amount after an ink near-end state is detected. Note that an ink near-end state is also called a non-remaining state. Alternatively, it may refer to a state where there is a possibility of idle ejection at the time point when the photosensor detects an ink near-end state. If a state is achieved where there is a possibility of idle ejection, the printer stops printing.

3. Detailed Configuration of Printer

Figure 3:
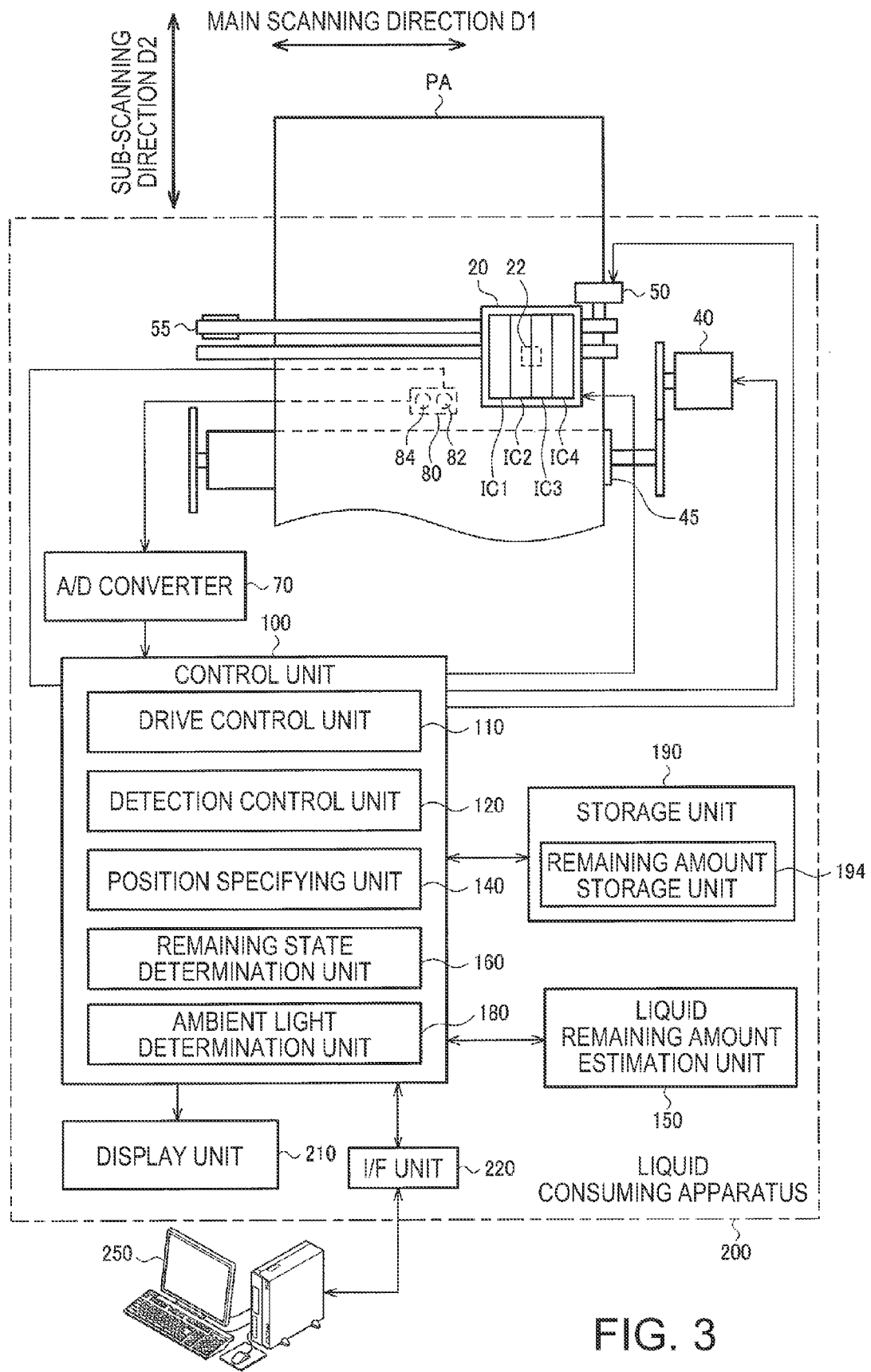
FIG. 3 shows an exemplary detailed configuration of the printer according to the present embodiment.

FIG. 3 shows an exemplary detailed configuration of the printer according to the present embodiment. In FIG. 3, a first direction D1 is the main scanning direction, and a second direction D2 that is orthogonal to the first direction D1 is the sub-scanning direction. Note that the following description will take, as an example, the case where the light reception result signal output by the photosensor 80 is a voltage signal (detection signal).

A printer 200 in FIG. 3 includes the ink cartridges IC1 to IC4, the carriage 20 provided with the holder 21 (not shown) that attachably and detachably holds the ink cartridges IC1 to IC4, the paper feed motor 40, the paper feed roller 45, the carriage motor 50, the carriage drive belt 55, an A/D converter 70, the photosensor 80, the control unit 100, the liquid remaining amount estimation unit 150, the storage unit 190, a display unit 210, and an interface unit (I/F unit) 220. Note that the same constituent elements as those described in FIG. 1 will be given the same reference numerals, and a description thereof will be omitted as appropriate. The configuration of the printer 200 is not limited to that in FIG. 3, and may be modified in various manners, such as omitting some of these constituent elements or adding other constituent elements.

The A/D converter 70 performs A/D conversion on the detection signal from the photosensor 80, and outputs a digital signal obtained after the A/D conversion to the control unit 100. Specifically, the A/D converter 70 samples the detection signal at predetermined position intervals in accordance with, for example, a count value of a rotary encoder, an interrupt cycle of a CPU constituting the control unit 100, or the like, and acquires a plurality of sampling voltages. For example, several dozens of sampling voltages are acquired when one cartridge passes above the photosensor 80.

The control unit 100 includes a drive control unit 110, a detection control unit 120, a position specifying unit 140, a remaining status determination unit 160, and an ambient light determination unit 180. The control unit 100 is realized by a processor such as a CPU and a program that runs on the processor. For example, processing of each unit in the control unit 100 is executed by the program stored in a ROM being deployed in the storage unit 190 and being executed by the processor. Note that the control unit 100 can also be realized by a dedicated ASIC. The details of processing of the ambient light determination unit 180 will be described later.

The drive control unit 110 controls a drive unit in the printer 200. Specifically, the drive control unit 110 controls the carriage motor 50, which is a drive unit. It controls the carriage motor 50 and moves the carriage 20. The holder 21 and the head 22 included in the carriage 20 are thereby driven to move by the carriage motor 50.

The detection control unit 120 performs various kinds of control of the photosensor 80. For example, the detection control unit 120 controls the light-emitting portion 82 of the photosensor 80. For example, the detection control unit 120 performs processing for determining the amount of light to be emitted by the light-emitting portion 82, based on the detection signal from the photosensor 80 or the like. It then generates a PWM signal based on the determined amount of light, and controls the amount of light to be emitted by the light-emitting portion 82. The detection control unit 120 also performs processing for determining a threshold value for determination of an ink near-end state performed based on a result of light reception by the light-receiving portion 84.

The position specifying unit 140 performs processing for specifying the position of the carriage 20 (the holder 21) in the main scanning direction D1. Upon the position of the carriage being specified, a position in the main scanning direction D1 at which the prism in each ink cartridge IC is immediately above the photosensor (which is also called a position facing the photosensor) is also specified. More specifically, the carriage motor 50 is provided with a rotary encoder. The position specifying unit 140 specifies the amount of movement of the carriage 20 based on the count value of the rotary encoder, and specifies the position of the carriage 20 in each path of printing. Note that a count value of the rotary encoder is associated with a position at which the prism in each ink cartridge IC faces the photosensor.

The remaining status determination unit 160 performs remaining status determination processing for determining the remaining state of the ink in each ink cartridge. For example, the remaining status determination unit 160 performs processing for determining whether or not the ink remains in each ink cartridge (ink near-end determination processing), based on the detection signal (detection voltage) from the photosensor 80 at the time when the photosensor 80 and the ink cartridge IC are at respective positions at which they face each other. Specifically, the detection voltage, which is the detection signal from the photosensor 80, is subjected to A/D conversion by the A/D converter 70, and is input as a digital signal to the control unit 100. The remaining status determination unit 160 in the control unit 100 performs the ink remaining status determination processing by performing processing for comparing the detection voltage with a threshold value, based on the detection voltage converted into the digital signal. For an ink cartridge regarding which it is determined that the ink is in a non-remaining state (i.e., an ink cartridge that is in an ink near-end state according to the determination), an alarm for indicating ink replacement is displayed on the display unit 210 or a display unit of a PC (personal computer) 250 connected via the I/F unit 220, and the user is thereby prompted to replace the ink cartridge.

Next, the liquid remaining amount estimation unit 150 performs processing for estimating the remaining amount of the ink (ink amount information or liquid amount information) and the amount of consumed ink. For example, the liquid remaining amount estimation unit 150 estimates the amount of the consumed ink, based on a dot count value of the number of times that the ink used for printing is discharged from the head 22. Specifically, the number of ink droplets ejected from the head 22 is counted, and the amount of the consumed ink (the amount of the used ink) is calculated by multiplying the counted number of ink droplets by the mass per ink droplet. This amount of the consumed ink includes the amount of the ink consumed for printing and the amount of the ink consumed for cleaning the head. The remaining amount of the ink is estimated by subtracting the calculated amount of the consumed ink from the amount of the ink initially loaded in each ink cartridge. During execution of printing, the remaining amount of the ink is updated for each path of printing and is stored in the storage unit 190. The remaining amount of the ink estimated in this manner is written and stored in the storage device 352 in each ink cartridge IC in FIG. 2. When the printer 200 is started, the remaining amount of the ink is read out and acquired from the storage device 352 in each ink cartridge IC and is stored in a remaining amount storage unit 194 in the storage unit 190. While power is turned on, the remaining amount of the ink in the remaining amount storage unit 194 is updated in conjunction with execution of printing, cleaning of the head 22, and the like. Furthermore, the updated estimated remaining amount of the ink is written back in the storage device 352 in each ink cartridge IC when the printer 200 is powered off, or when the ink cartridge IC is replaced, or every time a predetermined amount of the ink is consumed.

Note that, although the following description is about the case where the ink amount information is the remaining amount of the ink, the ink amount information may be the amount of the consumed ink. The remaining amount of the ink and the amount of the consumed ink may be stored as ink weight data, or may be stored as data of the ratio thereof to the amount of the ink loaded in the ink cartridge IC before beginning to be used.

The storage unit 190 includes the remaining amount storage unit 194. The remaining amount storage unit 194 stores the sequentially updated remaining amount of the ink estimated by the liquid remaining amount estimation unit 150. The storage unit 190 serves as a work area for the control unit 100 and the liquid remaining amount estimation unit 150, and the functions thereof can be realized by a memory such as a RAM or an EEPROM, a HDD (hard disk drive), or the like.

Figure 14:
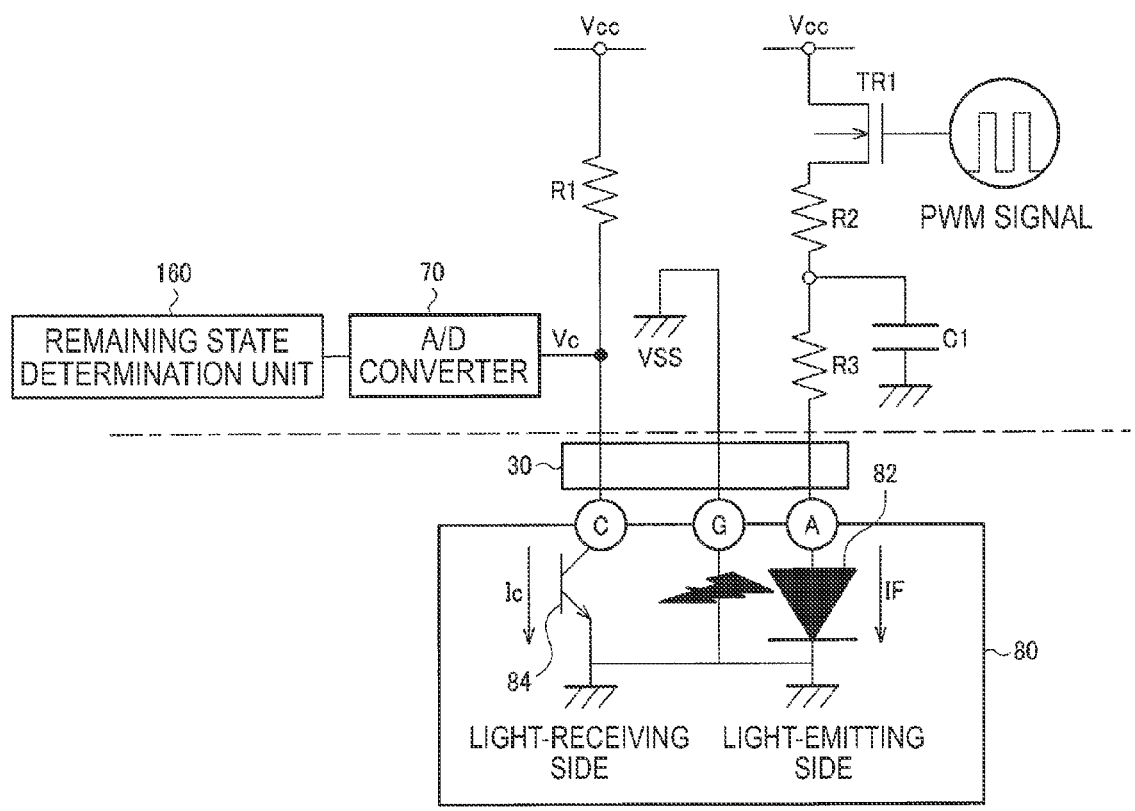
FIG. 14 shows an exemplary configuration of the photosensor.

FIG. 14 shows an exemplary specific configuration of the photosensor 80. Note that the configuration of the photosensor 80 is not limited to that in FIG. 14, and various modifications are possible.

The photosensor 80 has the light-emitting portion 82 and the light-receiving portion 84. The light-emitting portion 82 radiates light, and the light-receiving portion 84 receives light. The photosensor 80 is constituted by a reflection photo-interrupter. The photosensor 80 adjusts the duty ratio (the ratio between the on-time and the off-time) of a PWM (Pulse Width Modulation) signal and causes an LED to emit light. The light emitted from the LED is reflected at the prism 320 in each ink cartridge IC, enters the phototransistor, and is thereafter converted into a current value. This current value is converted into voltage Vc by a resistor R1, this voltage Vc is subjected to A/D conversion by the A/D convertor 70, and a digital signal obtained after the A/D conversion is input to the remaining status determination unit 160 in the control unit 100.

As described above, in the present embodiment, the photosensor 80 has the light-emitting portion 82 and the light-receiving portion 84, and each ink cartridge has the prism 320 that reflects the light emitted from the light-emitting portion 82 of the photosensor 80 in accordance with the remaining status of the ink. The control unit 100 then performs the remaining status determination processing for the ink in each ink cartridge, based on the detection signal (the detection voltage after the A/D conversion) obtained by the light-receiving portion 84 of the photosensor 80 receiving the reflected light from the prism 320.

4. Ink Near-End Detection Technique

Figure 4:
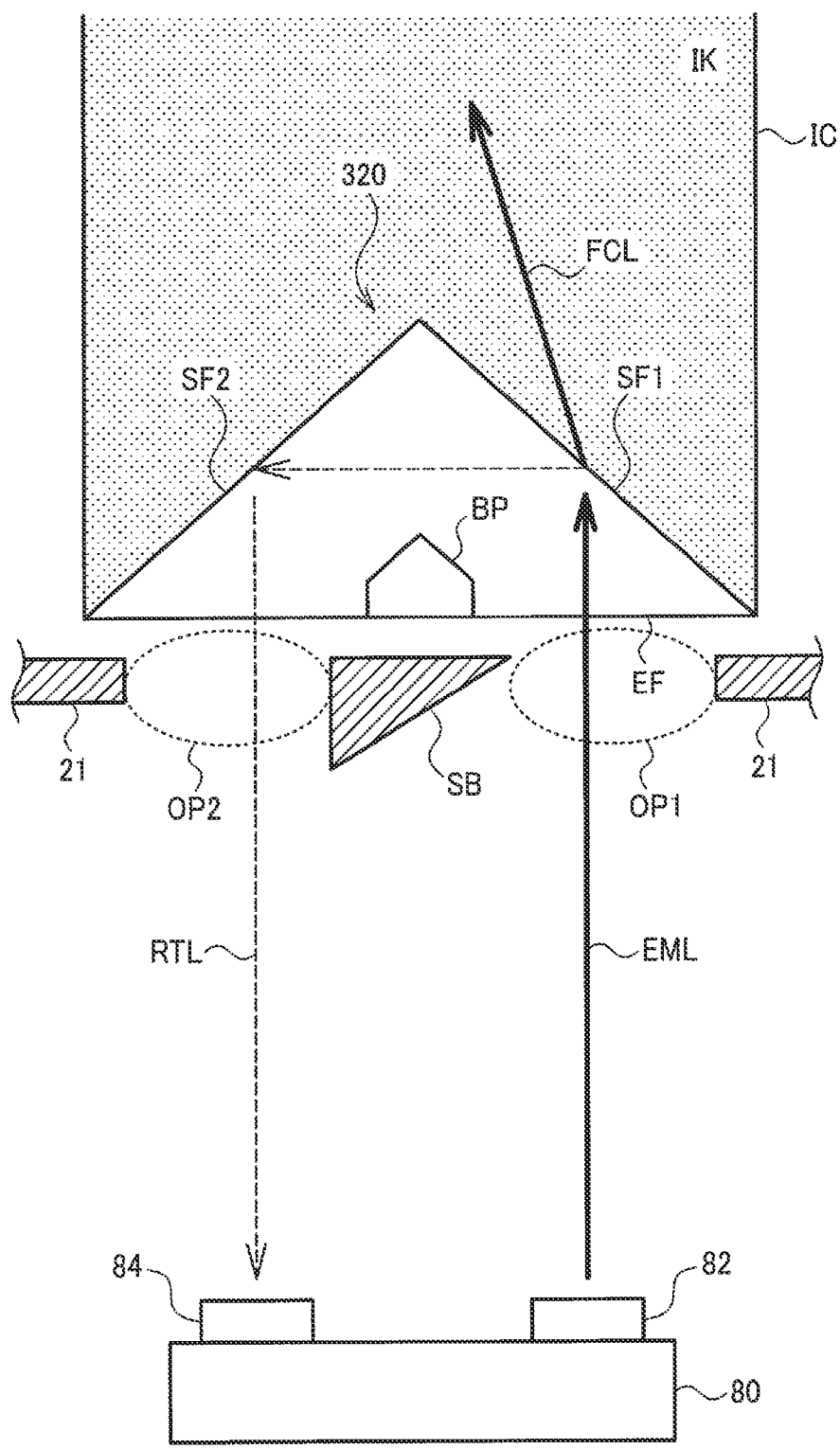
FIG. 4 is a diagram illustrating an ink near-end determination technique.
Figure 5:
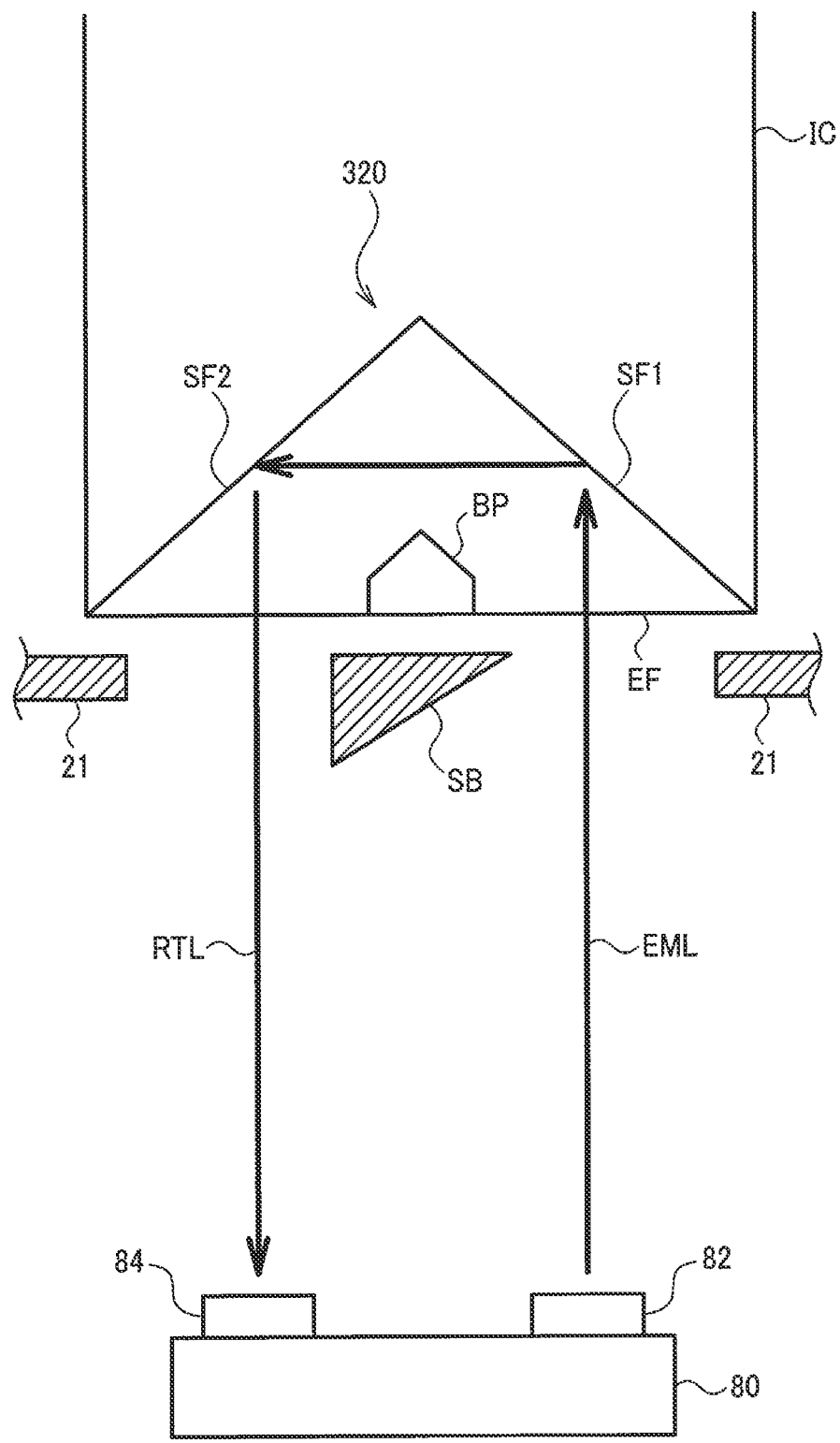
FIG. 5 is another diagram illustrating an ink near-end determination technique.

Next, an ink near-end detection technique will be described. FIGS. 4 and 5 are cross-sectional views in a YZ plane that passes through the prism 320 in an ink cartridge IC. FIGS. 4 and 5 show a state where the positional relationship between the prism 320 and the photosensor 80 is a positional relationship with which an ink near-end state can be detected (i.e., a positional relationship in which the prism in the ink cartridge faces the photosensor).

As shown in FIG. 4, an incident face EF of the prism 320 is provided with a cavity portion BP in order to suppress deformation that occurs when the prism 320 is formed. Openings are provided in the holder 21 and are configured such that the incident face EF faces the photosensor 80 through the openings when the ink cartridge IC is installed in the holder 21. Specifically, an opening OP1 of the holder 21 is provided at a position at which light EML emitted from the light-emitting portion 82 can pass through the opening OP1 and enter an inclined face SF1 of the prism 320 when the prism 320 in the ink cartridge IC is in a positional relationship in which it faces the photosensor 80. Meanwhile, an opening OP2 of the holder 21 is provided at a position at which reflected light RTL that is reflected by an inclined face SF2 of the prism 320 can pass through the opening OP2 and enter the light-receiving portion 84. That is to say, the openings (OP1 and OP2) are provided in the holder 21 at the same interval as the interval between the light-emitting portion 82 and the light-receiving portion 84 in the photosensor 80. The inclined faces SF1 and SF2 of the prism 320 face inward of the ink containing portion 300 shown in FIG. 2. When the ink containing portion 300 is filled with the ink IK, the inclined faces SF1 and SF2 come into contact with the ink IK. The inclined face SF1 is a face orthogonal to the inclined face SF2, for example, and the inclined face SF1 and the inclined face SF2 are arranged so as to be symmetric with respect to a plane parallel with an XZ plane in FIG. 1.

When the ink cartridge IC is filled with the ink IK, the light EML that enters the prism 320 from the light-emitting portion 82 passes through the opening of the holder 21 and enters the ink IK from the inclined face SF1 (light FCL). In this case, the amount of the light RTL reflected at the inclined faces SF1 and SF2 is very small, and accordingly the light-receiving portion 84 hardly receives the light. For example, assuming that the refractive index of the ink is 1.5, which is almost the same as the refractive index of water, if the prism 320 is made of polypropylene, the critical angle of total reflection at the inclined faces SF1 and SF2 is approximately 64 degrees. Since the incident angle is 45 degrees, the light is not totally reflected at the inclined faces SF1 and SF2, and the incident light EML enters the ink IK.

Next, the case will be considered where the ink IK in the ink cartridge IC is consumed for printing and the ink cartridge IC is not filled with the ink IK, as shown in FIG. 5. Assume that at least a portion of the inclined faces SF1 and SF2 of the prism 320 to which the light from the light-emitting portion 82 is radiated is in contact with the air. In this case, the light EML that enters the prism 320 from the light-emitting portion 82 is totally reflected at the inclined faces SF1 and SF2, and again exits to the outside of the prism 320 from the incident face EF (light RTL). Since the light-receiving portion 84 receives the totally reflected light RTL, detection voltage is obtained that is different from the detection voltage in the case where the ink cartridge IC is filled with the ink (i.e., having a large difference from reference voltage). For example, when the refractive index of the air is 1 and the prism 320 is made of polypropylene, the critical angle of total reflection at the inclined faces SF1 and SF2 is approximately 43 degrees. Since the incident angle is 45 degrees, the incident light EML is totally reflected at the inclined faces SF1 and SF2.

Figure 6:
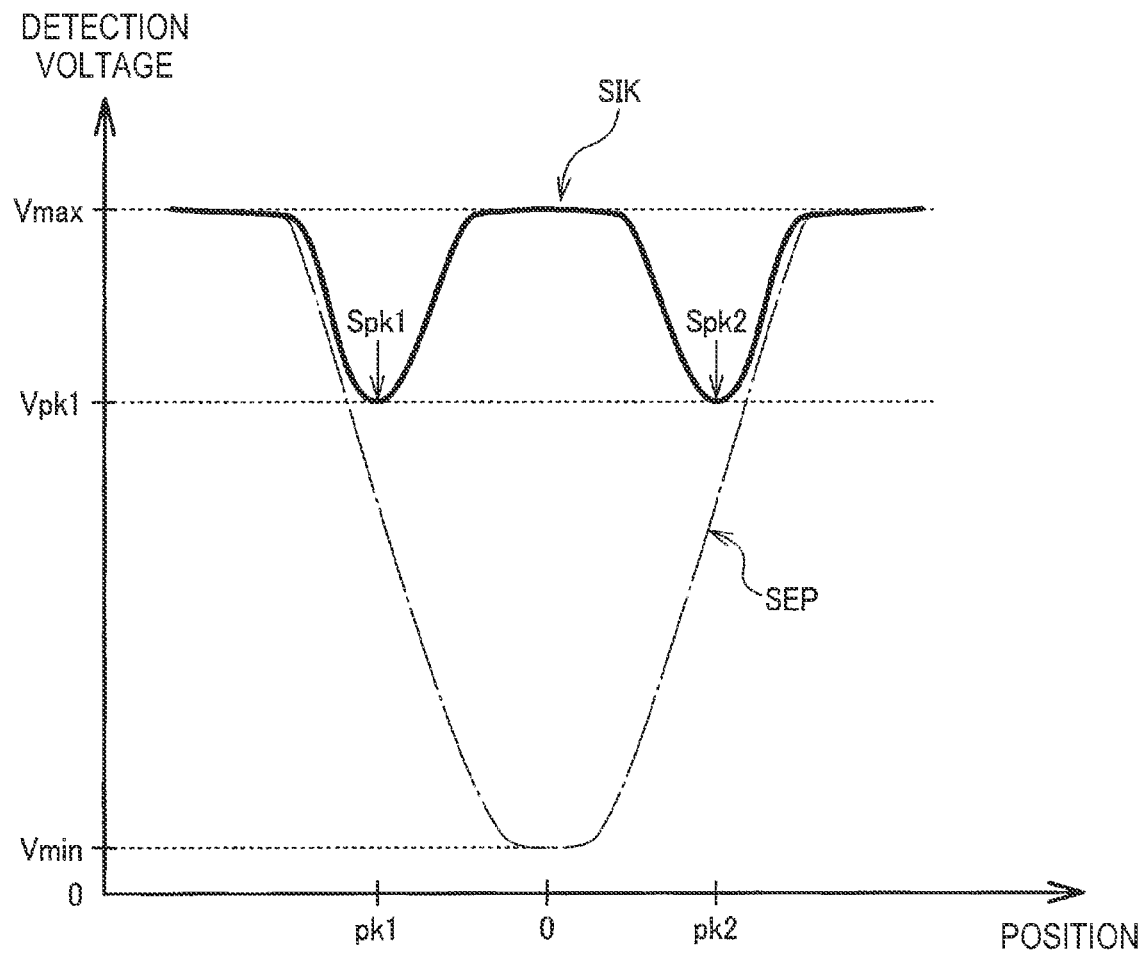
FIG. 6 shows an exemplary characteristic of detection voltage.

Next, FIG. 6 shows an exemplary characteristic of the detection voltage when one ink cartridge IC passes above the photosensor 80. The horizontal axis in FIG. 6 indicates a relative position between the prism 320 and the photosensor 80, and the position at which the center of the prism 320 coincides with the center of the photosensor 80 (e.g., the positional relationship between the ink cartridge IC and the photosensor 80 shown in FIG. 4) is "0". Note that the center of the photosensor 80 is the center between the light-emitting portion 82 and the light-receiving portion 84 in the main scanning direction. The vertical axis in FIG. 6 indicates detection voltage that is output from the photosensor 80 at each position on the horizontal axis.

As shown in FIG. 6, the closer the amount of the light received by the light-receiving portion 84 is to zero, the closer the detection voltage is to upper limit voltage Vmax (reference voltage). Also, the larger the amount of the light received by the light-receiving portion 84 is, the closer the detection voltage is to lower limit voltage Vmin (i.e., the larger the difference from the reference voltage is). When the amount of the received light exceeds a predetermined value, the detection voltage is saturated and reaches the lower limit voltage Vmin. The upper limit voltage Vmax and the lower limit voltage Vmin correspond respectively to upper limit voltage and lower limit voltage in the range of voltage that the light-receiving portion 84 shown in FIG. 4 outputs to a collector terminal, for example.

As shown in FIG. 6, the detection voltage changes in accordance with the relative position between the photosensor 80 and the prism 320. First, SIK indicates a detection voltage characteristic in the case where the ink cartridge IC is filled with the ink IK, as described in FIG. 4. In this case, since the amount of the light received by the light-receiving portion 84 is small, the detection voltage is close to Vmax at the position "0". At positions pk1 and pk2, each indicating the relative position between the center of the prism 320 and the center of the photosensor 80 shifted from the position "0" in the main scanning direction, peaks Spk1 and Spk2 occur due to the reflected light from the incident face EF of the prism.

On the other hand, SEP indicates a detection voltage characteristic in the case where the ink cartridge IC is not filled with the ink IK, as described in FIG. 5. In this case, since the amount of the light received by the light-receiving portion 84 is large, the detection voltage reaches (or approaches) Vmin at the position "0". The characteristic of the detection voltage significantly differs in this manner depending on whether or not the ink cartridge IC is filled with the ink IK. In the present embodiment, an ink near-end state of each ink cartridge is detected by detecting this difference in the detection voltage characteristic.

Specifically, a threshold value Vth is set between a peak value Vpk1 of the detection voltage characteristic SIK and the lower limit voltage Vmin, based on the peak value Vpk1. If the detection voltage of the photosensor 80 is smaller than the threshold value Vth when in a detection range in which the ink cartridge IC passes above the photosensor 80, it is determined that the ink cartridge IC is in an ink near-end state (i.e., the ink is in a non-remaining state), and if the detection voltage is larger than or equal to the threshold value Vth, it is determined that the ink is in a remaining state.

5. Details of Processing

Next, prior to the description of a flow of the processing in the present embodiment, a specific example of a relationship between the remaining status of the ink and ambient light will be described using FIGS. 7A to 7D.

FIG. 7A shows an exemplary case where the ink cartridge IC is sufficiently filled with the ink IK. In this case, it can be said that the ink IK in the ink cartridge IC is in a remaining state. Since the light-receiving portion 84 of the photosensor 80 is not receiving ambient light, if the remaining status determination processing is performed based on the detection signal obtained from the photosensor 80 in this state, it is possible to correctly determine that the ink is in a remaining state.

FIG. 7B shows a specific example of the case where the ink IK in the ink cartridge IC is in a remaining state as in FIG. 7A, and the light-receiving portion 84 of the photosensor 80 is receiving ambient light NL. If the remaining status determination processing is performed based on the detection signal obtained from the photosensor 80 in this state, the light-receiving portion 84 hardly receives the reflected light that is radiated from the light-emitting portion 82 and reflected by the prism, but receives ambient light NL. For this reason, there are cases where it is incorrectly determined that the ink IK in the ink cartridge IC is in a non-remaining state. In these cases, a problem arises in that, regardless of the ink being in a remaining state, printing is stopped and an instruction to replace the ink cartridge IC is given to the user.

FIG. 7C is an exemplary case where the ink IK in the ink cartridge IC is in a non-remaining state (a near-end state). In the example in FIG. 7C, the light-receiving portion 84 of the photosensor 80 is not receiving ambient light, as in the example in FIG. 7A. For this reason, if the remaining status determination processing is performed based on the detection signal obtained from the photosensor 80 in this state, it can be correctly determined that the ink is in a non-remaining state.

FIG. 7D shows a specific example of the case where the ink IK in the ink cartridge IC is in a non-remaining state, and the light-receiving portion 84 of the photosensor 80 is receiving ambient light NL, as in FIG. 7C. If the remaining status determination processing is performed based on the detection signal obtained from the photosensor 80 in this state, the light-receiving portion 84 receives both the ambient light NL and the reflected light that is radiated from the light-emitting portion 82 and reflected by the prism. For this reason, in many cases, it is correctly determined that the ink IK in the ink cartridge IC is in a non-remaining state, and it can be considered that consequently there is no actual harm. However, because of the influence of the ambient light, it cannot be said that the remaining status determination processing is normally performed. When the remaining amount of liquid is estimated based on the detection signal from the photosensor 80, a problem arises since the remaining amount of the liquid is incorrectly estimated due to the influence of the ambient light.

Next, the details of the processing in the present embodiment will be described using flowcharts in FIGS. 8 and 9. The following will describe processing for one ink cartridge. However, as mentioned above, in actuality, the liquid consuming apparatus 200 has a plurality of ink cartridges, and the control unit 100 and the liquid remaining amount estimation unit 150 perform the processing of the flowcharts in FIGS. 8 and 9 for each ink cartridge.

Initially, upon receiving a print job, the control unit 100 (mainly, the drive control unit 110 and the position specifying unit 140) controls the carriage motor 50 and performs printing with one time of path (S100). Note that a movement of the head 22 in the +Y direction or in the −Y direction in conjunction with printing is considered to be one path. For example, the case of performing printing when the head 22 moves in both directions is considered to be one reciprocation and accordingly to be two paths. The control unit 100 (mainly, the detection control unit 120 and the remaining status determination unit 160) then causes the light-emitting portion to emit light during printing with one path, and performs the remaining status determination processing for determining the remaining status of the liquid in the ink cartridge, based on the detection signal obtained from the photosensor 80 (S101). Note that this remaining status determination processing is performed in accordance with the ink near-end detection technique described above using FIGS. 4 to 6.

If the control unit 100 (the remaining status determination unit 160) determines, in the remaining status determination processing, that the ink remains, i.e., that the ink is in a remaining state as in FIG. 7A described above (S102), the control unit 100 determines whether or not printing for one page has finished (S103). Furthermore, if the control unit 100 determines that printing for one page has finished, the control unit 100 advances to printing of the next page (S104). On the other hand, if the control unit 100 determines that printing for one page has not finished, the control unit 100 advances to the next path in order to continue printing of the same page (S105), and repeats the processing from the process in step S100.

If the control unit 100 (the remaining status determination unit 160) determines, in the remaining status determination processing in step S101, that the ink is in a non-remaining state (S102), the storage unit 190 stores non-remaining state detection information. Note that non-remaining state detection information is information (a flag) indicating that there is a possibility that the ink is in a non-remaining state, and is not information indicating that a non-remaining state is confirmed. This is because it is unknown whether or not the photosensor 80 is adversely affected by ambient light at this time point, and accordingly it cannot be concluded that the remaining status of the ink according to the determination based on the detection signal of the photosensor 80 coincides with the actual status. For this reason, in this case, it is considered that the ink in the ink cartridge and the photosensor 80 are in any of the states in FIGS. 7B to 7D described above.

Next, the control unit 100 determines whether or not the remaining amount of the liquid estimated based on the dot count is larger than or equal to a given remaining amount (a specified value) (S106). Note that the remaining amount of the liquid in this step is estimated by the liquid remaining amount estimation unit 150 performing the dot count using the aforementioned method.

Figure 10A:
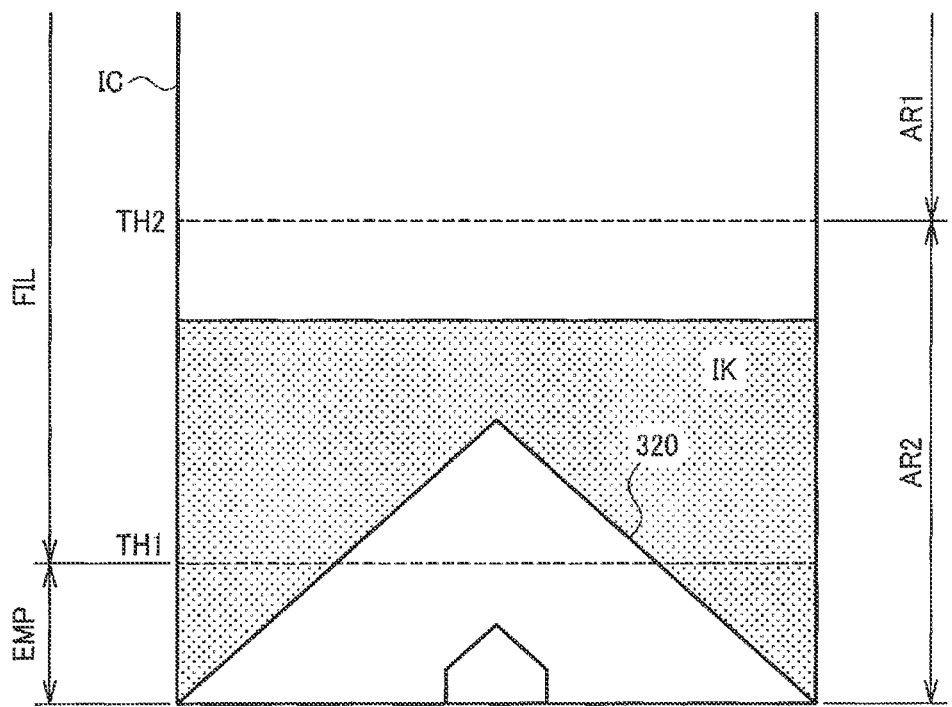
FIGS. 10A and 10B are diagrams illustrating the remaining status and the remaining amount of ink.
Figure 10B:
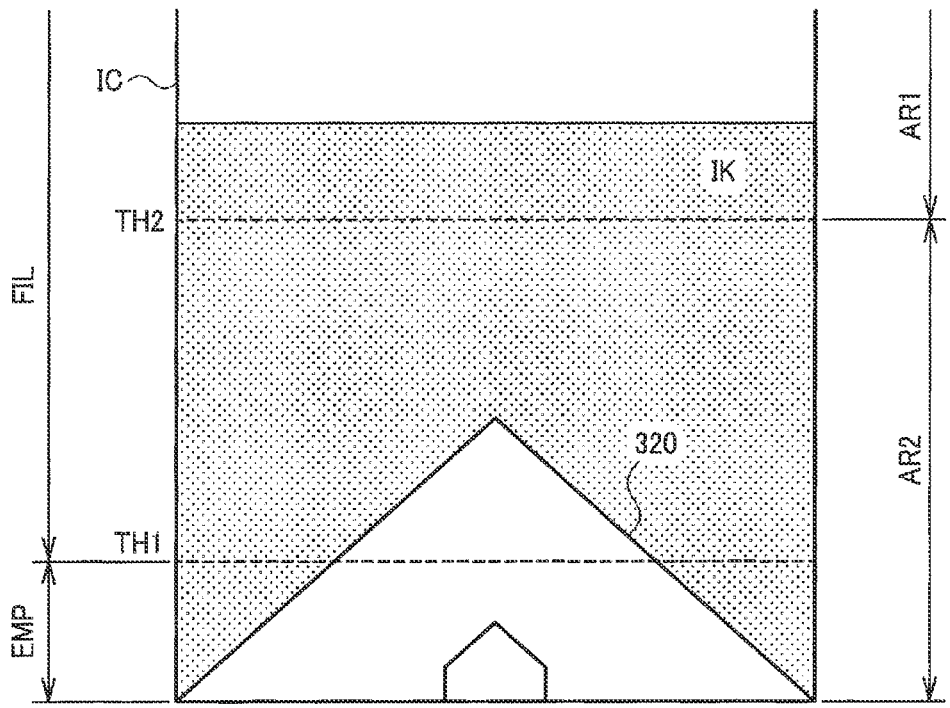

The details of the process in step S106 will now be described using FIGS. 10A and 10B. FIGS. 10A and 10B show states where the ink IK in the ink cartridge IC is in a remaining state but is close to a non-remaining state. It is premised in the examples in FIGS. 10A and 10B that it is determined that the ink IK is in a remaining state if the remaining amount of the ink IK in the ink cartridge IC is larger than or equal to a first remaining amount TH1, and it is determined that the ink IK is in a non-remaining state if the remaining amount of the ink IK in the ink cartridge IC is smaller than the first remaining amount TH1. That is to say, it is determined that the ink IK is in a remaining state if the ink liquid surface is within a range FIL shown in FIGS. 10A and 10B, and it is determined that the ink IK is in a non-remaining state if the ink liquid surface is within a range EMP shown in FIGS. 10A and 10B.

Although processing for accurately determining the remaining status of the ink IK is performed by the photosensor 80 as mentioned above, in actuality, accurate determination is needed when the ink liquid surface is within a range AR2 near the boundary between the range FIL and the range EMP. On the other hand, when the ink liquid surface is within a range AR1 that is above the range AR2, the ink IK sufficiently remains and will not enter a non-remaining state even if printing is continued for a while. Accordingly, the remaining status determination processing based on the detection signal of the photosensor 80 does not need to be performed immediately.

For this reason, in step S106, it is determined whether the ink liquid surface is within the range AR1 or within the range AR2, based on whether or not the remaining amount of the ink IK is larger than or equal to a second remaining amount TH2 (the aforementioned given remaining amount). The second remaining amount TH2 is set as an amount with which it is estimated that the ink necessarily remains even if the remaining amount obtained by the liquid remaining amount estimation unit varies due to an individual difference of the printer. It is then determined based on the result thereof whether or not the ambient light determination processing based on the detection signal of the photosensor 80 needs to be immediately performed. In the present embodiment, it is roughly determined whether or not the ink is close to a non-remaining state (the second remaining amount TH2), based on the remaining amount of the ink estimated based on the dot count. If the ink is close to a non-remaining state, it is determined based on the detection signal of the photosensor 80 whether or not the remaining status of the ink is correctly detected.

If the control unit 100 determines that the remaining amount of the liquid estimated based on the dot count is larger than or equal to the given remaining amount TH2 (S106), that is, in the case of the example in FIG. 10B, it can be determined that the ink remaining status determination processing using the detection signal obtained from the photosensor 80 does not need to be performed. This is because, as mentioned above, it is necessary to accurately determine the remaining status based on the detection signal obtained from the photosensor 80, immediately before (or after) the ink transitions from a remaining state to a non-remaining state, but the remaining status determination processing based on the detection signal of the photosensor 80 does not need to be performed when it can be determined that the ink sufficiently remains. For this reason, in this case, the control unit 100 determines that the result of the remaining status determination processing in step S101 is incorrect. That is to say, in this case, it can be considered that, although the ink IK is actually in a remaining state as in the example in FIG. 7B, it is incorrectly determined due to the influence of ambient light or the like that the ink IK is in a non-remaining state. The control unit 100 then performs processing for discarding the detection information stored in the storage unit 190 (S107). This detection information discarding processing is processing for erasing the non-remaining state detection information stored in the storage unit 190. Even if a non-remaining state is detected with the photosensor 80 due to ambient light, it is estimated that the ink remains, and accordingly printing can be continued. For this reason, after step S107, printing is continued (S103 to S105) as in the case where it is determined in step S102 that the ink is in a remaining state.

That is to say, if the control unit 100 determines that the liquid in a first ink cartridge among the plurality of ink cartridges is in a non-remaining state and determines that the remaining amount of the liquid in the first ink cartridge estimated by the liquid remaining amount estimation unit 150 is larger than or equal to the given remaining amount, the control unit 100 cancels the determination that the liquid in the first ink cartridge is in a non-remaining state, and continues printing.

With this configuration, even if the remaining status determination processing is adversely affected by ambient light, printing can be continued when it can be determined that the ink is in a remaining state, for example.

On the other hand, if the control unit 100 determines in step S106 that the remaining amount of the liquid estimated based on the dot count is smaller than the given remaining amount TH2, that is, in the case of the example in FIG. 10A, there is a possibility that the state of the ink will soon transition from a remaining state to a non-remaining state, or has already transitioned to a non-remaining state. At this time point, it is considered that the ink in the ink cartridge and the photosensor 80 are in either the state in FIG. 7C or the state in FIG. 7D described above. Accordingly, in this case, the ambient light determination processing is performed for determining whether or not the remaining status determination processing performed in step S101 is adversely affected by ambient light.

That is to say, the control unit 100 performs the ambient light determination processing (S108) if the control unit 100 determines that the liquid is in a non-remaining state, in the remaining status determination processing (S101) during execution of printing.

Specifically, the control unit 100 (mainly, the detection control unit 120) turns off the light of the photosensor 80, and the control unit 100 (mainly, the ambient light determination unit 180) performs the ambient light determination processing (S108).

Also, at this time, the control unit 100 performs the ambient light determination processing when the photosensor 80 and the prism in each ink cartridge are in a positional relationship in which they face each other. A positional relationship in which the photosensor 80 and the prism in each ink cartridge face each other is, for example, the positional relationship between the ink cartridge IC and the photosensor 80 shown in FIG. 4.

Taken together, the liquid consuming apparatus 200 includes the carriage 20 in which the photosensor 80 or the ink cartridges are installed and that moves back and forth. The control unit 100 changes a relative positional relationship between each ink cartridge and the photosensor 80 when executing printing, causes, at the time of a given print path, the photosensor 80 to emit light, and performs the remaining status determination processing based on the detection signal obtained from the photosensor 80. At the time of a print path other than the given print path, the control unit 100 turns off the light of the photosensor 80 and performs the ambient light determination processing based on the detection signal obtained from the photosensor 80.

Here, FIG. 11A shows a state at the time of the liquid remaining status determination processing, and FIG. 11B shows a state at the time of the ambient light determination processing. In FIGS. 11A and 11B, the holder 21 accommodates the ink cartridges IC1 to IC4, and the ink cartridge IC1 and the photosensor 80 are in a positional relationship in which they face each other. In both cases of FIGS. 11A and 11B, the ambient light NL enters the light-receiving portion 84 of the photosensor 80.

As shown in FIG. 11A, in the liquid remaining status determination processing, the light-emitting portion 82 of the photosensor 80 radiates light to the prism 320 in the ink cartridge IC1, and the remaining status of the liquid is determined by the light-receiving portion 84 receiving the reflected light from the prism 320. However, at this time, the light-receiving portion 84 simultaneously receives the ambient light NL as well, and accordingly an incorrect determination processing result is obtained in some cases.

In contrast, in the ambient light determination processing, as shown in FIG. 11B, the ink cartridge IC1 and the photosensor 80 are caused to be in the same positional relationship as that in FIG. 11A, and the light of the light-emitting portion 82 is turned off. The ambient light NL received by the light-receiving portion 84 is detected in the state in FIG. 11A. Note that the ambient light determination processing itself is performed as with the ink near-end detection technique described using FIGS. 4 to 6. For example, when the detection voltage decreases by a predetermined level from Vmax even though the light of the photosensor 80 is turned off, it is determined that the ambient light is present, and if the detection voltage remains close to the upper limit voltage Vmax (the reference voltage), it is determined that the ambient light is not present.

With this configuration, the light-receiving portion 84 of the photosensor 80 can detect only ambient light without receiving the light radiated by the light-emitting portion 82, and it can be determined whether or not the liquid remaining status determination processing is adversely affected by the ambient light, for example.

Also, by causing an ink cartridge and the photosensor 80 to be in a positional relationship in which they face each other, it is possible to detect ambient light received by the photosensor 80 when the ink remaining status determination processing is performed on this ink cartridge, using the photosensor 80.

Next, if the control unit 100 determines in step S109 that the photosensor 80 is not receiving ambient light (S109), the control unit 100 determines that the result of the remaining status determination processing in step S101 is correct, and confirms that the ink is in a non-remaining state (S110). That is to say, in this case, it is considered that the ink IK is actually in a non-remaining state as in the example in FIG. 7C, and that it has been correctly determined that the ink IK is in a non-remaining state, without being affected by ambient light or the like. At this time, printing is stopped, and a message for prompting the user to replace the ink cartridge is displayed.

On the other hand, if the control unit 100 determines in step S109 that the photosensor 80 is receiving ambient light (S109), the control unit 100 determines that there is a possibility that the result of the remaining status determination processing in step S101 contains an error, and, as in step S107, the control unit 100 performs processing for discarding the detection information stored in the storage unit 190 (S111). In this manner, when proceeding to step S111, it can be determined that the reliability of the result of the remaining status determination processing based on the detection signal of the photosensor 80 in step S101 is low due to ambient light. For this reason, it cannot be immediately determined that the ink is in a non-remaining state. However, since it has been determined that the remaining amount of the liquid estimated based on the dot count of the liquid remaining amount estimation unit 150 is smaller than the given remaining amount, at least it can be determined that the ink is close to a non-remaining state or already in a non-remaining state as in the example in FIG. 7D or FIG. 10A. That is to say, citing the example in FIG. 10A, at least the ink liquid surface is within the range AR2, but it cannot be concluded that the ink liquid surface is in the range EMP indicating that the ink is in a non-remaining state.

Here, summarizing the flow of the processing up to step S110 or step S111, if the control unit 100 determines that, for example, the liquid in a second ink cartridge among the plurality of ink cartridges is in a non-remaining state (S102) and determines that the remaining amount of the liquid in the second ink cartridge estimated by the liquid remaining amount estimation unit 150 is smaller than the given remaining amount (S106), the control unit 100 performs the ambient light determination processing for determining whether or not the remaining status determination processing is affected by ambient light (S108). Furthermore, if the control unit 100 determines, in the ambient light determination processing, that the remaining status determination processing is not affected by ambient light (S109), the control unit 100 confirms that the liquid in the second ink cartridge is in a non-remaining state (S110), and if the control unit 100 determines that the remaining status determination processing is affected by ambient light, the control unit 100 cancels the determination that the liquid in the second ink cartridge is in a non-remaining state (S111) and continues printing (S112 in later-described FIG. 9).

With this configuration, it can be determined whether or not a result of the liquid remaining status determination processing based on the detection signal obtained from the photosensor 80 is correct.

Furthermore, in the present embodiment, if the processing proceeds to step S111 and printing is currently being performed on a sheet (or a page), the printing is not stopped and is continued until the printing on this sheet finishes. This is because, if printing is stopped in the middle of a sheet, the user redoes the printing in many cases, and the print on this sheet is often wasted. Also, even if it is determined that the ink is in a non-remaining state, printing for one sheet or so can be performed with the ink remaining in the ink cartridge in many cases.

That is to say, in the present embodiment, the control unit 100 performs the remaining status determination processing for the liquid in the ink cartridge, based on the detection signal detected by the photosensor 80 due to reflection from the prism 320 when the light is emitted by the photosensor 80 (S101). The control unit 100 then performs the ambient light determination processing for determining whether or not the remaining status determination processing is affected by ambient light, based on the detection signal detected by the photosensor 80 at the time when light is not emitted by the photosensor 80 (S108), and continues printing until the end of the printing on a sheet that is currently being printed even if the control unit 100 determines that the influence of ambient light is present, by the ambient light determination processing during execution of printing (S109).

With this configuration, it is possible to suppress stopping of printing in the middle of the printing on one sheet.

Figure 8:
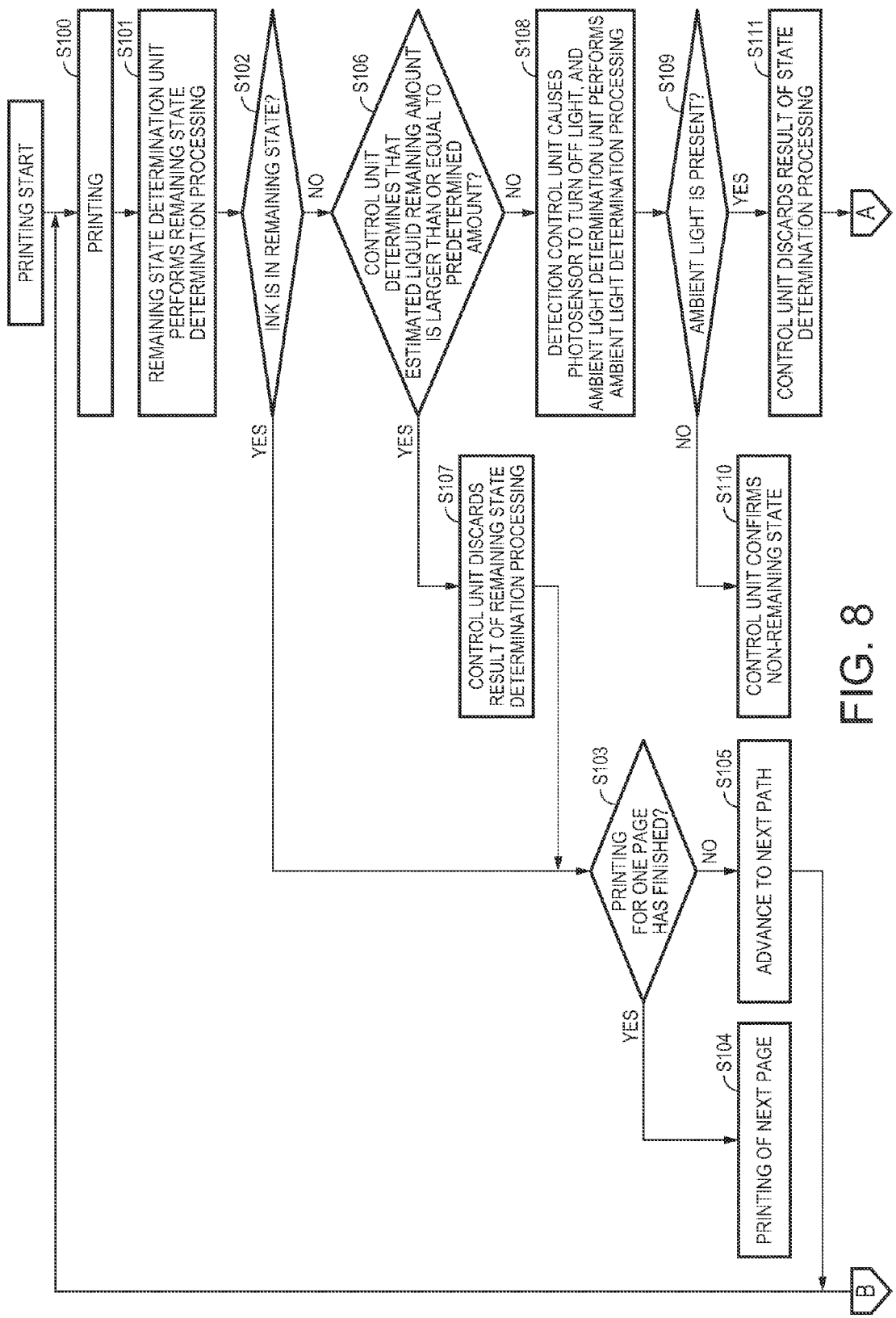
FIG. 8 is a flowchart illustrating a flow of processing in the present embodiment.

Specifically, after step S111 in FIG. 8, printing is continued as indicated in step S112 in FIG. 9. The control unit 100 then determines whether or not printing on the sheet which is a current print target has finished (S113).

Then, the control unit 100 continues printing (S112) even after determining by the ambient light determination processing (S108) that the remaining status determination processing is affected by ambient light (S109), performs second ambient light determination processing for determining whether or not the remaining status determination processing is affected by ambient light (later-described S115) every time a given specified amount of the liquid is consumed (later-described S114), and performs the remaining status determination processing (S101) if the control unit 100 determines, in the second ambient light determination processing, that the remaining status determination processing is not affected by ambient light (later-described S116).

It is thereby possible to determine whether or not the influence of ambient light on the remaining status determination processing has disappeared while printing is continued. Furthermore, since the second ambient light determination processing is performed every time the given specified amount of the ink is consumed, it is possible to quickly check that, when the adverse influence of ambient light has disappeared during printing, a state where the adverse influence of ambient light is not present is restored from the state where it is determined that the adverse influence of ambient light is present.

Specifically, if it is determined in step S113 that printing on the current sheet has not finished, the control unit 100 determines whether or not the amount of the ink consumed during the printing in step S112 is larger than or equal to a specified value (S114). At this time, the liquid remaining amount estimation unit 150 calculates the amount of the consumed ink by means of the dot count. The control unit 100 then determines whether or not the amount of the consumed ink estimated by the liquid remaining amount estimation unit 150 is larger than or equal to the specified value. The amount of the consumed ink estimated at this time is the amount of the ink consumed while loop processing from step S112 to step S114 is being performed. As described later, when the processing exits the loop processing from step S112 to S114, the amount of the consumed ink that is consumed in step S112 and estimated by the liquid remaining amount estimation unit 150 is reset.

If the control unit 100 determines that the amount of the ink consumed during the printing in step S112 is not larger than or equal to the specified value (S114), the processing returns to the printing processing in step S112.

On the other hand, if the control unit 100 determines that the amount of the ink consumed during the printing in step S112 is larger than or equal to the specified value, the control unit 100 turns off the light of the photosensor 80 and performs the second ambient light determination processing as in step S108 (S108).

This second ambient light determination processing is processing performed in order to determine whether or not an environment in which ambient light adversely affects the remaining status determination processing has been improved by the user or the like (i.e., whether or not ambient light is blocked) while the printing is continued in step S112. If it can be determined, in the second ambient light determination processing, that the adverse influence of ambient light has been removed while the printing is continued (S116), the liquid remaining status determination processing can be correctly performed based on the detection signal of the photosensor 80. For this reason, in this case, the processing returns to step S100.

On the other hand, if it is determined, in the second ambient light determination processing, that adverse influence of ambient light is still present and the environment has not been improved while the printing is continued in step S112 (S116), the control unit 100 determines whether or not there is a possibility of idle ejection (S117). Specifically, the control unit 100 determines whether or not the accumulated amount of the consumed ink estimated by the liquid remaining amount estimation unit 150 is larger than or equal to a given threshold value. The accumulated amount of consumption refers to the amount of the ink consumed in step S111 and subsequent steps, and is estimated by the liquid remaining amount estimation unit 150 based on the dot count. Note that the accumulated amount of consumption is different from the amount of consumption used in step S114, and is accumulated without being reset even if the loop from step S112 to step S114 is repeated.

In the present embodiment, basically, printing is not stopped until printing on the sheet that is the current print target finishes, as mentioned above. However, in the case of using a large amount of ink for the printing on this sheet, exceptionally, the printing has to be stopped in the middle even if the printing on the current sheet has not completely finished in some cases. This is because, if printing is continued with no remaining ink, idle ink ejection will occur.

Specifically, if the liquid remaining amount estimation unit 150 estimates that the amount of the consumed liquid is larger than or equal to a given amount (i.e., if the control unit 100 determines that the accumulated amount of consumption is larger than or equal to the given amount) after the control unit 100 determines, in the ambient light determination processing, that the remaining status determination processing is affected by ambient light (S117), the control unit 100 determines that there is a possibility of idle ejection and stops the printing even in the middle of printing on a sheet (S118). Note that, when stopping the printing, the control unit 100 stops drive of the carriage. The control unit 100 then causes the display unit 210 to display a message of an instruction to replace the ink cartridge, for example (S119).

It is thereby possible to suppress idle ink ejection, for example.

On the other hand, if the control unit 100 determines that the accumulated amount of the consumed ink is smaller than the given amount (S117), the processing returns to step S112 and is repeated.

If the control unit 100 determines in aforementioned step S113 that the printing on the current sheet has finished, the processing comes to a break point, and therefore the ambient light determination processing and the ink remaining status determination processing are redone on this occasion. This is because, as mentioned above, there is a possibility that the environment in which ambient light adversely affects the remaining status determination processing has been improved while printing is continued, and if the environment has been improved, the remaining state of the ink can be correctly determined in a state where the adverse influence of ambient light is not present. This is also because the influence of temporal suspension of printing on the print waiting time while each processing is performed is relatively small at this timing.

First, the control unit 100 performs third ambient light determination processing for determining whether or not the remaining status determination processing is affected by ambient light, when printing for one sheet finishes (S120).

This third ambient light determination processing is performed after the control unit 100 turns off the light of the photosensor 80, as in the second ambient light determination processing.

It is thereby possible to determine, at the time when printing for one sheet finishes, whether or not the state of the influence of ambient light on the remaining status determination processing has changed, for example.

Next, if the control unit 100 determines, in the third ambient light determination processing, that the remaining status determination processing is affected by ambient light (S121), the control unit 100 notifies the user of the presence of ambient light (S122).

The control unit 100 can thereby cause the display unit 210 to display a message for giving an instruction to check opening/closing of the cover of the printer, for example (S122).

On the other hand, if the control unit 100 determines, in the third ambient light determination processing, that the remaining status determination processing is not affected by ambient light, the control unit 100 performs the second remaining status determination processing for the liquid in the ink cartridge (S123). If the control unit 100 then determines, in the second remaining status determination processing, that the liquid is in a non-remaining state (S124), the control unit 100 confirms the determination result indicating a non-remaining state (S125).

It is thereby possible to check that the ink is in a non-remaining state in the case where the adverse influence of ambient light is not present at the time when printing for one sheet finishes, for example.

If the control unit 100 determines, in the second remaining status determination processing, that the liquid is in a remaining state (S124), the control unit 100 performs printing of the next sheet (S126).

It is thereby possible to correctly re-determine that the ink is in a remaining state and continue printing in the case where the adverse influence of ambient light is not present at the time when printing for one sheet finishes, for example. The above is the flow of the processing in the present embodiment.

Note that, if a non-remaining state is confirmed in step S110 or step S125, printing may be continued until the accumulated amount of the consumed ink after step S101 reaches the given amount.

Note that an example has been described above where the technique in the present embodiment is applied to the case of an on-carriage configuration in which the holder 21 in which the ink cartridges are installed and the head 22 are installed in the carriage 20. However, the present embodiment is not limited thereto. For example, the technique in the present embodiment may also be applied to an off-carriage printer in which the holder 21 in which the ink cartridges are installed is not on the carriage 20 but is located at a fixed position in the printer.

FIG. 12 shows the case where the invention is applied to an off-carriage printer. The photosensor 80 is installed in the carriage 20 including the head 22, and the carriage motor 50 moves the carriage 20 in which the head 22 and the photosensor 80 are installed, so as to face the prism 320 in each ink cartridge. In this case, the control unit 100 will perform control for moving, using the carriage motor 50, the carriage 20 including the photosensor 80 such that the photosensor 80 installed in the carriage 20 and each ink cartridge achieve a given positional relationship (a positional relationship with which the remaining status of the ink in the ink cartridge can be detected using the photosensor 80).

That is to say, in FIGS. 11A and 11B, the remaining status determination processing and the ambient light determination processing are performed, while the position (detection position) of the photosensor 80 is fixed and the ink cartridge installed in the holder 21 in the carriage 20 moves. In contrast, in FIG. 12, the remaining status determination processing and the ambient light determination processing are performed, while the ink cartridge is fixed to the printer and the carriage 20 in which the head 22 and the photosensor 80 are installed moves by being driven by the carriage motor 50. With this configuration, the technique in the present embodiment can also be applied to a so-called off-carriage printer.

6. Comparative Example

Figure 13:
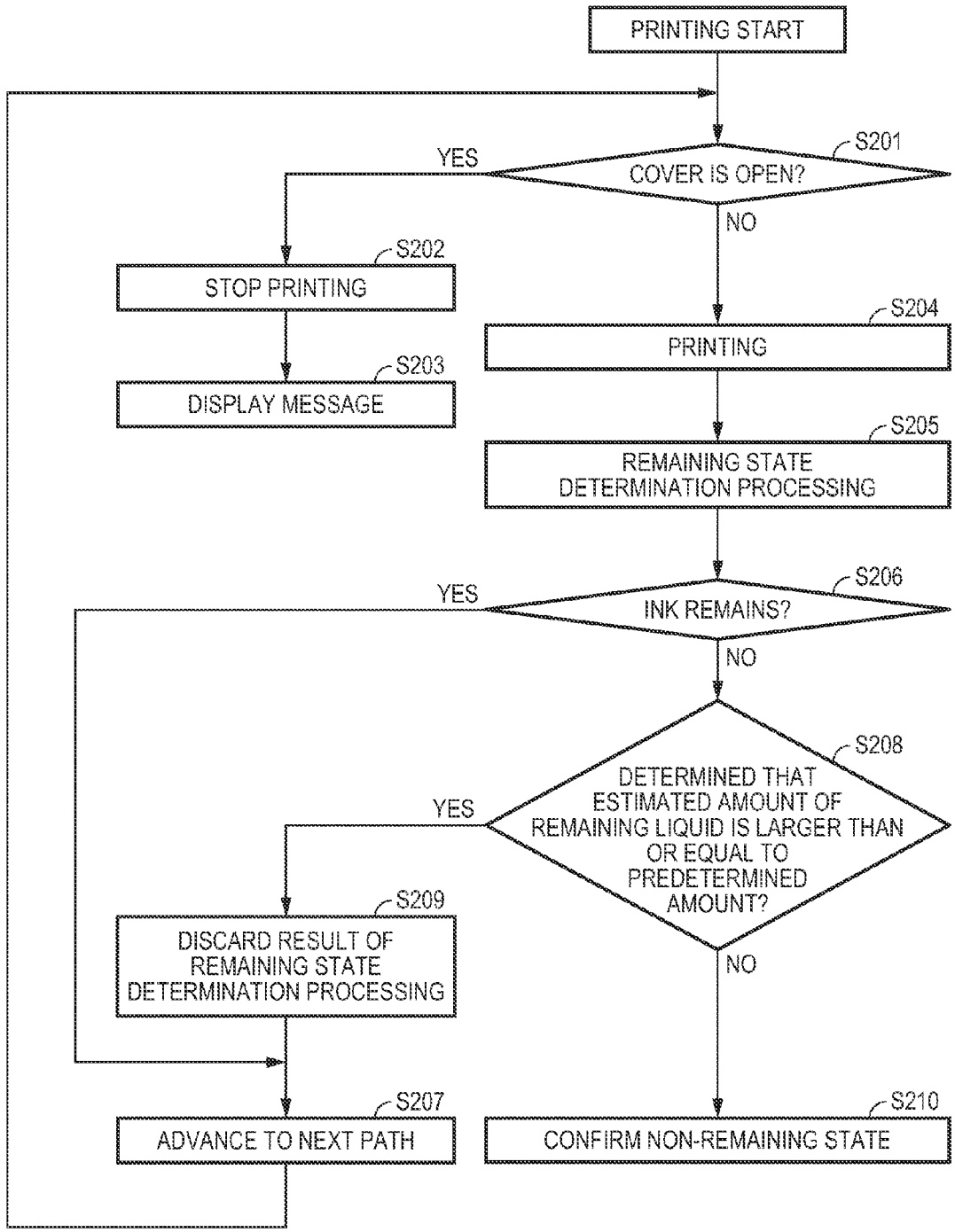
FIG. 13 is a flowchart illustrating a flow of processing in a comparative example.

Next, a comparative example of the present embodiment will be described using a flowchart in FIG. 13, and an advantage of the technique in the present embodiment over the comparative example will be described.

Initially, the printer in the comparative example determines, before actually performing printing, whether or not the cover of the printer is open, in order to eliminate the influence of ambient light on the ink remaining status determination processing (S201). This cover is provided in the printer so as to cover the respective mechanisms shown in FIG. 1. The printer includes a sensor capable of detecting opening and closing of the cover.

If the printer in the comparative example determines that the cover is open, the printer determines that the remaining status determination processing is adversely affected by ambient light, stops printing (S202), and displays, on a display unit, a message that the cover is open (S203).

On the other hand, if the printer determines that the cover is correctly closed, the printer determines that the remaining status determination processing is not adversely affected by ambient light, and performs printing with one path (S204). Thereafter, the printer performs the ink remaining status determination processing, based on the detection signal obtained from the photosensor (S205). If the printer determines that the ink is in a remaining state, in the remaining status determination processing (S206), the printer advances to printing of the next path (S207), and returns to step S201.

On the other hand, if the printer determines that the ink is in a non-remaining state, in the remaining status determination processing (S206), the printer determines whether or not the estimated remaining amount of the liquid is larger than or equal to a given amount (S208). If the printer determines that the estimated remaining amount of the liquid is larger than or equal to the given amount, the printer discards the determination result indicating that the ink is in a non-remaining state (S209) as in step S107 in the above-described processing in the present embodiment in FIG. 8, advances to printing of the next path (S207), and returns to step S201.

If the printer determines that the estimated remaining amount of the liquid is smaller than the given amount, the printer confirms that the determination result indicating that the ink is in a non-remaining state (S210). The above is the flow of the processing in the comparative example.

Thus, in the case of the comparative example, the carriage is stopped if the cover is open regardless of the remaining amount of the liquid in the cartridge. Accordingly, the carriage is more frequently stopped during printing. In contrast, in the present embodiment, even if it is determined that ambient light is present, printing can be continued if it can be determined that there is no possibility of idle ejection.

Note that the aforementioned determination of whether or not printing on the current sheet has finished in step S113 in FIG. 9 is the determination of whether or not printing for one page has finished, if the print job is for single-sided printing. If the print job is for two-sided printing, it is the determination of whether or not printing for two pages, i.e., printing for one sheet has finished.

Although the present embodiment has been described above in detail, those skilled in the art will easily understand that the embodiment can be modified in various manners so as not to substantially depart from the new matter and the effect of the invention. Accordingly, all these modifications are to be encompassed in the scope of the invention. For example, a term that is used at least once together with another term having a broader or the same meaning in the specification or the drawings can be replaced with the other term in any part of the specification or the drawings. The configuration and operations of the liquid consuming apparatus is not limited to those described in the present embodiment either, and various modifications are possible.

The entire disclosure of Japanese Patent Application No. 2014-034097, filed on Feb. 25, 2014 is expressly incorporated herein by reference.

What is claimed is:

1. A liquid consuming apparatus comprising:
   a photosensor having a light-emitting portion and a light-receiving portion and capable of facing a prism provided in a liquid container; and
   a control unit that controls printing,
   wherein the control unit performs remaining status determination processing for determining remaining status of liquid in the liquid container, based on a detection signal detected by the photosensor due to reflection from the prism when light is emitted by the photosensor,
   the control unit performs ambient light determination processing for determining whether or not the remaining status determination processing is affected by ambient light, based on the detection signal detected by the photosensor when light is not emitted by the photosensor, and
   the control unit continues printing until the end of printing on a sheet that is currently being printed, even if the control unit determines, during execution of the printing, that the influence of the ambient light is present, by the ambient light determination processing.

2. The liquid consuming apparatus according to claim 1, wherein the control unit performs the ambient light determination processing if the control unit determines that the liquid is in a non-remaining state, by the remaining status determination processing during execution of printing.

3. The liquid consuming apparatus according to claim 1, further comprising a carriage in which the photosensor or the liquid container is installed, the carriage moving back and forth during execution of printing,
   wherein the control unit changes a relative positional relationship between the liquid container and the photosensor at the time of execution of printing,
   the control unit causes, at the time of a given print path, the photosensor to emit light, and performs the remaining status determination processing, based on the detection signal obtained from the photosensor, and
   at the time of a print path other than the given print path, the control unit turns off the light of the photosensor and performs the ambient light determination processing, based on the detection signal obtained from the photosensor.

4. The liquid consuming apparatus according to claim 1, further comprising a liquid remaining amount estimation unit that estimates a remaining amount of liquid in the liquid container, wherein if the liquid remaining amount estimation unit estimates that an consumed amount of liquid is larger than or equal to a given amount, after the control unit determines, in the ambient light determination processing, that the remaining status determination processing is affected by the ambient light, the control unit stops printing even in the middle of the printing on the sheet.

5. The liquid consuming apparatus according to claim 1,
wherein the control unit continues printing even after determining by the ambient light determination processing that the remaining status determination processing is affected by the ambient light,
the control unit performs second ambient light determination processing for determining whether or not the remaining status determination processing is affected by the ambient light, every time a given specified amount of liquid is consumed, and
the control unit performs the remaining status determination processing if the control unit determines, in the second ambient light determination processing, that the remaining status determination processing is not affected by the ambient light.

6. The liquid consuming apparatus according to claim 1,
wherein the control unit performs third ambient light determination processing for determining whether or not the remaining status determination processing is affected by the ambient light, when printing for one sheet finishes.

7. The liquid consuming apparatus according to claim 6,
wherein if the control unit determines, in the third ambient light determination processing, that the remaining status determination processing is affected by the ambient light, the control unit notifies a user of the presence of the ambient light.

8. The liquid consuming apparatus according to claim 6,
wherein if the control unit determines, in the third ambient light determination processing, that the remaining status determination processing is not affected by the ambient light, the control unit performs the second remaining status determination processing for the liquid in the liquid container, and
if the control unit determines, in the second remaining status determination processing, that the liquid is in a remaining state, printing of the next sheet is performed.

9. The liquid consuming apparatus according to claim 6,
wherein if the control unit determines, in the third ambient light determination processing, that the remaining status determination processing is not affected by the ambient light, the control unit performs the second remaining status determination processing for the liquid in the liquid container, and
if the control unit determines that the liquid is in a non-remaining state, in the second remaining status determination processing, the control unit confirms a determination result indicating the non-remaining state.

10. A method for controlling a liquid consuming apparatus, comprising:
controlling printing;
performing remaining status determination processing for determining remaining status of liquid in a liquid container, based on a detection signal detected by a photosensor, which has a light-emitting portion and a light-receiving portion and is capable of facing a prism provided in the liquid container, due to reflection from the prism when light is emitted by the photosensor;
performing ambient light determination processing for determining whether or not the remaining status determination processing is affected by ambient light, based on the detection signal detected by the photosensor when light is not emitted by the photosensor, and
continuing printing until the end of printing on a sheet that is currently being printed, even if the control unit determines, during execution of the printing, that the influence of the ambient light is present, by the ambient light determination processing.

* * * * *